(12) United States Patent
Morikawa et al.

(10) Patent No.: US 11,010,648 B2
(45) Date of Patent: May 18, 2021

(54) IMAGE PROCESSING APPARATUS CONVERTING TARGET PARTIAL IMAGE DATA TO PARTIAL PRINT DATA USING FIRST PROFILE OR SECOND PROFILE

(71) Applicant: Brother Kogyo Kabushiki Kaisha, Nagoya (JP)

(72) Inventors: Shota Morikawa, Nagoya (JP); Masashi Kuno, Obu (JP); Satoru Arakane, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 16/887,718

(22) Filed: May 29, 2020

(65) Prior Publication Data

US 2020/0293842 A1 Sep. 17, 2020

Related U.S. Application Data

(63) Continuation of application No. 16/525,990, filed on Jul. 30, 2019, now Pat. No. 10,685,267.

(30) Foreign Application Priority Data

Aug. 6, 2018 (JP) .............................. JP2018-147988
Aug. 6, 2018 (JP) .............................. JP2018-147989

(51) Int. Cl.
*G06K 15/02* (2006.01)
*G06K 15/10* (2006.01)

(52) U.S. Cl.
CPC ......... *G06K 15/188* (2013.01); *G06K 15/102* (2013.01); *G06K 15/1809* (2013.01);

(Continued)

(58) Field of Classification Search
CPC ............... H04N 1/6091; H04N 1/6008; G06K 15/1809; G06K 15/188
See application file for complete search history.

(56) References Cited

U.S. PATENT DOCUMENTS 8,284,448 B2 * 10/2012 Fujiwara ................ H04N 1/603
358/1.9
9,616,659 B2 ‡ 4/2017 Morikawa
(Continued)

FOREIGN PATENT DOCUMENTS

JP 2005-342962 A ‡ 12/2005
JP 2005-342962 A    12/2005
(Continued)

*Primary Examiner* — King Y Poon
(74) *Attorney, Agent, or Firm* — Banner & Witcoff, Ltd.

(57) ABSTRACT

An image processing apparatus performs a first generation process generating first partial print data by a first color conversion process using a first profile corresponding to a first direction, and a second generation process generating second partial print data using a second color conversion process using a second profile. When a color difference is smaller than a reference, the apparatus sets a printing direction to the first direction, and outputs the first partial print data to a print execution unit for printing the first partial print data while the main scan moves in the first direction. When the color difference is larger than or equal to the reference, the apparatus sets the printing direction to the second direction, and outputs the second partial print data to the print execution unit for printing the second partial print data while the main scan moves in the second direction.

12 Claims, 10 Drawing Sheets

(52) U.S. Cl.
CPC ..... *G06K 15/1857* (2013.01); *G06K 15/1861*
(2013.01); *G06K 15/1881* (2013.01)

(56) References Cited

U.S. PATENT DOCUMENTS

| | | | |
|---|---|---|---|
| 2015/0283805 A1* | 10/2015 | Yuda | B41J 2/2132 |
| | | | 347/9 |
| 2016/0191745 A1* | 6/2016 | Morikawa | H04N 1/407 |
| | | | 358/523 |
| 2017/0050431 A1‡ | 2/2017 | Morikawa | |
| 2017/0157947 A1‡ | 6/2017 | Morikawa | |

FOREIGN PATENT DOCUMENTS

| | | | |
|---|---|---|---|
| JP | 2006-110795 A | ‡ | 4/2006 |
| JP | 2006-110795 A | | 4/2006 |
| JP | 2017-039205 A | ‡ | 2/2017 |
| JP | 2017-039205 A | | 2/2017 |

\* cited by examiner
‡ imported from a related application

COLOR EVALUATION INFORMATION CI

| No. | RGB VALUE | | | WEIGHT |
|---|---|---|---|---|
| | R | G | B | Wt |
| 1 | 0 | 0 | 0 | Wt1 |
| 2 | 0 | 0 | 32 | Wt2 |
| 3 | 0 | 0 | 64 | Wt3 |
| 4 | 0 | 0 | 96 | Wt4 |
| 82 | 32 | 32 | 0 | Wt82 |
| 83 | 32 | 32 | 32 | Wt83 |
| 84 | 32 | 32 | 64 | Wt84 |
| 85 | 32 | 32 | 96 | Wt85 |
| 86 | 32 | 32 | 128 | Wt86 |
| 726 | 255 | 255 | 160 | Wt726 |
| 727 | 255 | 255 | 192 | Wt727 |
| 728 | 255 | 255 | 224 | Wt728 |
| 729 | 255 | 255 | 255 | Wt729 |

FIRST EMBODIMENT

SECOND EMBODIMENT

THIRD EMBODIMENT

FOURTH EMBODIMENT

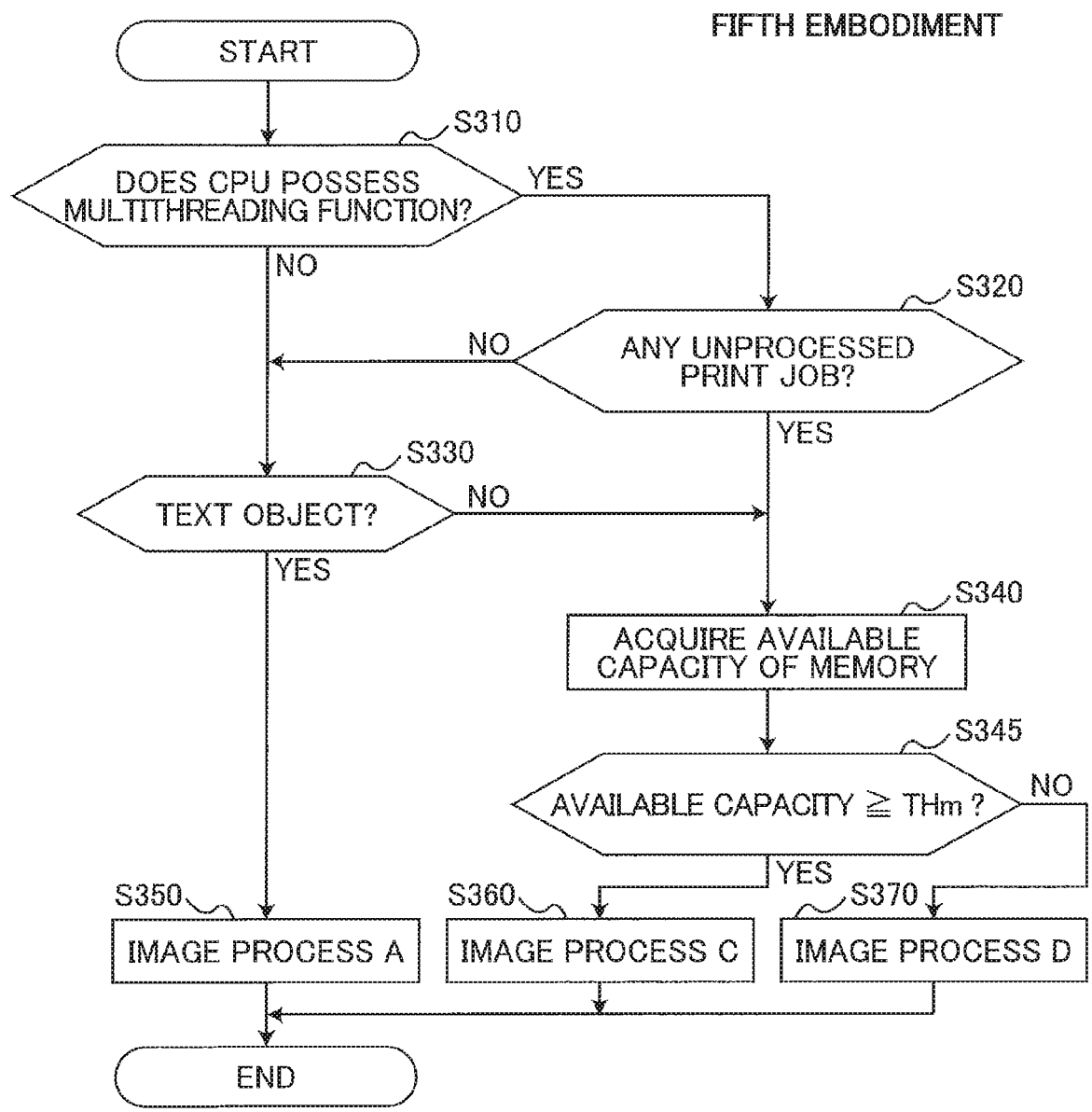

IMAGE PROCESSING APPARATUS CONVERTING TARGET PARTIAL IMAGE DATA TO PARTIAL PRINT DATA USING FIRST PROFILE OR SECOND PROFILE

CROSS REFERENCE TO RELATED APPLICATION

This application is a continuation of U.S. patent application Ser. No. 16/525,990 filed Jul. 30, 2019 which claims priority from Japanese Patent Application Nos. 2018-147988 filed Aug. 6, 2018 and 2018-147989 filed Aug. 6, 2018. The entire content of each of these priority applications is incorporated herein by reference.

TECHNICAL FIELD

The present disclosure relates to an image process for a print execution unit that performs printing by executing a partial print to form dots while performing a main scan and a sub scan a plurality of times.

BACKGROUND

A first conventional image processing apparatus provided for a multifunction peripheral that prints images using ejection processes for ejecting ink while moving a print head in a forward direction, and ejection processes for ejecting ink while moving the print head in a reverse direction. This image processing apparatus determines based on pixel values in band image data whether a condition has been met, and specifically whether a relatively large color difference is produced between a band image printed through an ejection process in the forward direction and a band image printed through an ejection process in the reverse direction. The image processing apparatus sets the direction for the ejection process to the forward direction when the condition is met and to the direction opposite the direction used in the preceding ejection process when the condition is not met.

A second conventional image forming apparatus also prints images while scanning in in a forward direction, and prints images while scanning in a reverse direction. In a case where it is estimated that a printed band has color irregularities, if the scanning direction is the forward direction, a color conversion process is executed using a basic table, and if the scanning direction is the reverse direction, the color conversion process is executed in a table which is adjusted so that a printed color becomes approximately the same with that when the scanning direction is the forward direction.

SUMMARY

However, with some images the first conventional image processing apparatus may be susceptible to setting the direction of ejection processes to the forward direction. In such cases, the printing speed may be much slower than when ejection processes in the forward direction are alternated with ejection processes in the reverse direction.

In view of the foregoing, it is a first object of the present disclosure to provide a technique capable of improving printing speed for printing operations using outgoing prints and return prints.

In the second conventional image forming apparatus, the scanning direction is always alternately changed between the forward direction and the reverse direction. When some kind of image is printed, the above-explained color conversion process cannot reduce the generation of color irregularities.

In view of the foregoing, it is a second object of the present disclosure to provide a technique reducing generation of color irregularities while printing images using outgoing prints and return prints.

In order to attain the above and other objects, the disclosure provides an image processing apparatus. The image processing apparatus includes a processor and a memory. The processor for controlling a print execution unit. The print execution unit includes a print head, a main scanning unit, and a sub scanning unit. The print head moves in a main scanning direction including an outgoing direction and a return direction opposite the outgoing direction. The print head includes a first nozzle configured to eject first type ink, and a second nozzle configured to eject second type ink. The second nozzle is positioned apart from the first nozzle in the main scanning direction. The main scanning unit is configured to perform a main scan to move the print head in one of the outgoing direction and the return direction as a printing direction. The sub scanning unit is configured to perform a sub scan to move a recording sheet relative to the print head in a sub scanning direction crossing the main scanning direction. The print execution unit performs printing a target image on the recording sheet by alternately executing a partial print and the sub scan a plurality of times. In the partial print the print head forms dots on the recording sheet for a partial image in the target image while the main scanning unit performs the main scan, the target image being based on target image data. The memory stores an outgoing color conversion profile and a return color conversion profile. The outgoing color conversion profile corresponds to the outgoing direction and being for an outgoing partial print which is a partial print while the main scanning unit moves the print head in the outgoing direction. The return color conversion profile corresponds to the return direction and being for a return partial print which is a partial print while the main scanning unit moves the print head in the return direction. The outgoing color conversion profile and the return color conversion profile are used for converting a first type color value into a second type color value having a plurality of component values corresponding to respective ones of a plurality of types of inks including the first type ink and the second type ink. The outgoing color conversion profile and the return color conversion profile are adjusted so that a first printed color approaches a second printed color. The first printed color is printed through the outgoing partial print based on a first converted color value which is one of the second type color value converted from an original color of the first type color value by using the outgoing color conversion profile, and the second printed color is printed through the return partial print based on a second converted color value which is one of the second type color value converted from the original color by using the return color conversion profile. The processor is configured to perform: setting target partial image data representing a target partial image in the target image, the target partial image data being a target for a partial print to print the target partial image, the target partial print being to be performed subsequent to a previous partial print in which the print head moves in a previous printing direction which is one of the outgoing direction and the return direction; a first generation process generating first partial print data by a first color conversion process for converting the target partial image data using a first profile which is one of the outgoing color conversion profile and the return color conversion profile corresponding to a first direction opposite the previous printing direction; a second generation process generating second partial print data by a second color conversion process for converting the target partial image data using a second profile which is one of the outgoing color conversion profile and the return color conversion profile corresponding to a second direction the same as the previous printing direction; determining whether a color difference is larger than or equal to a reference, the color difference being a difference between color printed using the first partial print data with the first direction set as the printing direction and color printed using the second partial print data with the second direction set as the printing direction; when the color difference is smaller than the reference, setting a target printing direction for the target partial print to the first direction; when the target printing direction is set to the first direction, outputting the first partial print data to the print execution unit for printing the first partial print data while performing the main scan with the first direction being set as the printing direction; when the color difference is larger than or equal to the reference, setting the target printing direction to the second direction; and when the target printing direction is set to the second direction, outputting the second partial print data to the print execution unit for printing the second partial print data while performing the main scan with the second direction being set as the printing direction.

According to another aspect, the disclosure provides a non-transitory computer readable storage medium storing a set of program instructions for an image processing apparatus. The image processing apparatus controls a print execution unit. The print execution unit includes: a print head moving in a main scanning direction including an outgoing direction and a return direction opposite the outgoing direction, the print head including a first nozzle configured to eject first type ink, and a second nozzle configured to eject second type ink, the second nozzle being positioned apart from the first nozzle in the main scanning direction; a main scanning unit configured to perform a main scan to move the print head in one of the outgoing direction and the return direction as a printing direction; and a sub scanning unit configured to perform a sub scan to move a recording sheet relative to the print head in a sub scanning direction crossing the main scanning direction, the print execution unit performing printing a target image on the recording sheet by alternately executing a partial print and the sub scan a plurality of times, wherein in the partial print the print head forms dots on the recording sheet for a partial image in the target image while the main scanning unit performs the main scan, the target image being based on target image data. The image processing apparatus includes a memory storing an outgoing color conversion profile and a return color conversion profile, the outgoing color conversion profile corresponding to the outgoing direction and being for an outgoing partial print which is a partial print while the main scanning unit moves the print head in the outgoing direction, the return color conversion profile corresponding to the return direction and being for a return partial print which is a partial print while the main scanning unit moves the print head in the return direction, the outgoing color conversion profile and the return color conversion profile being used for converting a first type color value into a second type color value having a plurality of component values corresponding to respective ones of a plurality of types of inks including the first type ink and the second type ink, the outgoing color conversion profile and the return color conversion profile being adjusted so that a first printed color approaches a second printed color, wherein the first printed color is printed through the outgoing partial print based on a first converted color value which is one of the second type color value converted from an original color of the first type color value by using the outgoing color conversion profile, and the second printed color is printed through the return partial print based on a second converted color value which is one of the second type color value converted from the original color by using the return color conversion profile. The set of program instructions includes: setting target partial image data representing a target partial image in the target image, the target partial image data being a target for a partial print to print the target partial image, the target partial print being to be performed subsequent to a previous partial print in which the print head moves in a previous printing direction which is one of the outgoing direction and the return direction; executing a first generation process generating first partial print data by a first color conversion process for converting the target partial image data using a first profile which is one of the outgoing color conversion profile and the return color conversion profile corresponding to a first direction opposite the previous printing direction; executing a second generation process generating second partial print data by a second color conversion process for converting the target partial image data using a second profile which is one of the outgoing color conversion profile and the return color conversion profile corresponding to a second direction the same as the previous printing direction; determining whether a color difference is larger than or equal to a reference, the color difference being a difference between color printed using the first partial print data with the first direction set as the printing direction and color printed using the second partial print data with the second direction set as the printing direction; when the color difference is smaller than the reference, setting a target printing direction for the target partial print to the first direction; when the target printing direction is set to the first direction, outputting the first partial print data to the print execution unit for printing the first partial print data while performing the main scan with the first direction being set as the printing direction; when the color difference is larger than or equal to the reference, setting the target printing direction to the second direction; and when the target printing direction is set to the second direction, outputting the second partial print data to the print execution unit for printing the second partial print data while performing the main scan with the second direction being set as the printing direction.

According to still another aspect, the disclosure provides a method for an image processing apparatus. The image processing apparatus controls a print execution unit. The print execution unit includes: a print head moving in a main scanning direction including an outgoing direction and a return direction opposite the outgoing direction, the print head including a first nozzle configured to eject first type ink, and a second nozzle configured to eject second type ink, the second nozzle being positioned apart from the first nozzle in the main scanning direction; a main scanning unit configured to perform a main scan to move the print head in one of the outgoing direction and the return direction as a printing direction; and a sub scanning unit configured to perform a sub scan to move a recording sheet relative to the print head in a sub scanning direction crossing the main scanning direction, the print execution unit performing printing a target image on the recording sheet by alternately executing a partial print and the sub scan a plurality of times, wherein in the partial print the print head forms dots on the recording sheet for a partial image in the target image while the main scanning unit performs the main scan, the target image being based on target image data. The image processing apparatus includes a memory storing an outgoing color conversion profile and a return color conversion profile, the outgoing color conversion profile corresponding to the outgoing direction and being for an outgoing partial print which is a partial print while the main scanning unit moves the print head in the outgoing direction, the return color conversion profile corresponding to the return direction and being for a return partial print which is a partial print while the main scanning unit moves the print head in the return direction, the outgoing color conversion profile and the return color conversion profile being used for converting a first type color value into a second type color value having a plurality of component values corresponding to respective ones of a plurality of types of inks including the first type ink and the second type ink, the outgoing color conversion profile and the return color conversion profile being adjusted so that a first printed color approaches a second printed color, wherein the first printed color is printed through the outgoing partial print based on a first converted color value which is one of the second type color value converted from an original color of the first type color value by using the outgoing color conversion profile, and the second printed color is printed through the return partial print based on a second converted color value which is one of the second type color value converted from the original color by using the return color conversion profile. The method includes: setting target partial image data representing a target partial image in the target image, the target partial image data being a target for a partial print to print the target partial image, the target partial print being to be performed subsequent to a previous partial print in which the print head moves in a previous printing direction which is one of the outgoing direction and the return direction; executing a first generation process generating first partial print data by a first color conversion process for converting the target partial image data using a first profile which is one of the outgoing color conversion profile and the return color conversion profile corresponding to a first direction opposite the previous printing direction; executing a second generation process generating second partial print data by a second color conversion process for converting the target partial image data using a second profile which is one of the outgoing color conversion profile and the return color conversion profile corresponding to a second direction the same as the previous printing direction; determining whether a color difference is larger than or equal to a reference, the color difference being a difference between color printed using the first partial print data with the first direction set as the printing direction and color printed using the second partial print data with the second direction set as the printing direction; when the color difference is smaller than the reference, setting a target printing direction for the target partial print to the first direction; when the target printing direction is set to the first direction, outputting the first partial print data to the print execution unit for printing the first partial print data while performing the main scan with the first direction being set as the printing direction; when the color difference is larger than or equal to the reference, setting the target printing direction to the second direction; and when the target printing direction is set to the second direction, outputting the second partial print data to the print execution unit for printing the second partial print data while performing the main scan with the second direction being set as the printing direction.

BRIEF DESCRIPTION OF THE DRAWINGS

The particular features and advantages of the disclosure as well as other objects will become apparent from the following description taken in connection with the accompanying drawings, in which:

FIG. 10 is a flowchart illustrating a process according to a fifth embodiment.

DETAILED DESCRIPTION

A. First Embodiment

A-1. Configuration of Printing System 1000

Figure 1:
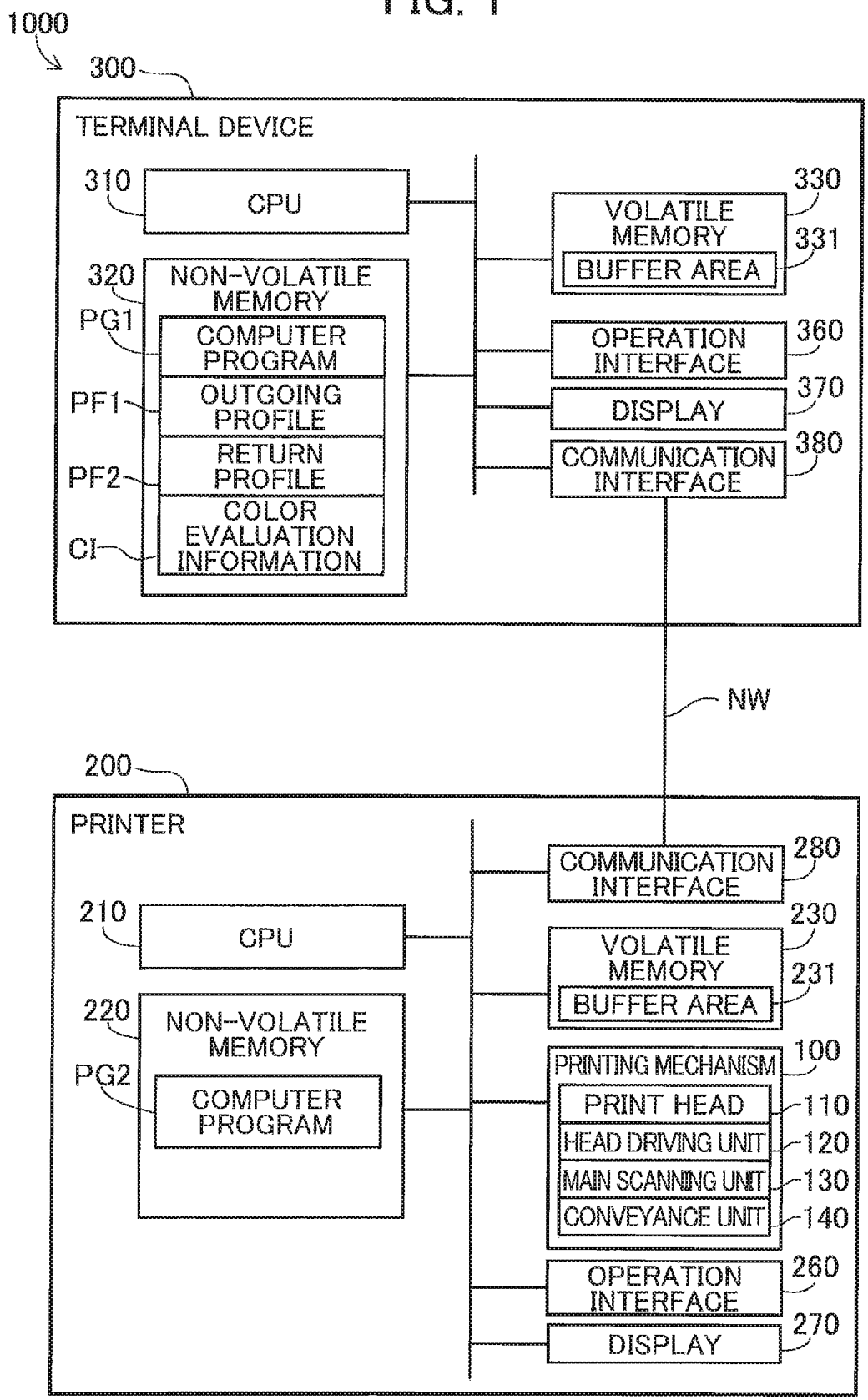
FIG. 1 is a block diagram illustrating a configuration of a printing system according to a first embodiment.

The first embodiment will now be described through examples. FIG. 1 is a block diagram illustrating the configuration of a printing system 1000 according to an embodiment.

The printing system 1000 includes a printer 200 and a terminal device 300 functioning as an image processor according to this embodiment. The printer 200 and the terminal device 300 are connected to each other to establish communication via a wire or wireless network NW.

The terminal device 300 is a calculator used by the user of the printer 200 and, for example, is a personal computer or a smart phone. The terminal device 300 includes a central processing unit (CPU) 310 functioning as a controller of the terminal device 300; a non-volatile memory 320, such as a hard disk drive; a volatile memory 330, such as a random access memory (RAM); an operation interface 360, such as a mouse and a keyboard; a display 370, such as a liquid crystal display; and a communication interface 380. The communication interface 380 includes a wire or wireless interface for connecting to the network NW.

The volatile memory 330 provides a buffer area 331 for the CPU 310. The non-volatile memory 320 stores a computer program PG1, an outgoing profile PF1, a return profile PF2, and color evaluation information CI. The computer program PG1, the outgoing profile PF1, the return profile PF2, and the color evaluation information CI are provided by the manufacturer of the printer 200, for example, in the form of data downloaded from a server or data stored in a DVD-ROM. The CPU 310 functions as a printer driver controlling the printer 200 by executing the computer program PG2. The CPU 310 as the printer driver performs an image process described below so as to control the printer 200 to print an image.

Each of the outgoing profile PF1 and the return profile PF2 defines a correlation between color values in the RGB color system (RGB values) and color values in the CMYK color system (CMYK values). The outgoing profile PF1 and the return profile PF2 are used for a color conversion process in an image process (described later) for converting RGB values to CMYK values. Each RGB value is a color value including three component values of red (R), green (G), and blue (B) colors. Each CMYK value is a color value including multiple component values corresponding to the number of inks used for printing. In this embodiment, each CMYK value includes component values of cyan (C), magenta (M), yellow (Y), and black (K) colors. Each of the RGB values and the CMYK values is, for example, 256 gradation value. The outgoing profile PF1 and the return profile PF2 are lookup tables for example. The color evaluation information CI and differences between the outgoing profile PF1 and the return profile PF2 will be described below.

The printer 200 includes, for example, a printing mechanism 100; a CPU 210 functioning as a controller of the printer 200; a non-volatile memory 220, such as a hard disk drive; a volatile memory 230, such as a RAM; an operation interface 260, such as buttons and a touch panel for receiving a user operation; a display 270, such as a liquid crystal display; and a communication interface 280. The communication interface 280 includes a wire or wireless interface for connecting to the network NW. The printer 200 is connected to an external device, e.g., the terminal device 300, to establish communication with each other via the communication interface 280.

The volatile memory 230 provides a buffer area 231 for temporarily storing various types of intermediate data generated during processing by the CPU 210. The non-volatile memory 220 stores the computer program PG2. The computer program PG2 in this embodiment is a control program for controlling the printer 200. The computer program PG2 can be stored in the non-volatile memory 220 before shipment of the printer 200. Alternatively, the computer program PG2 may be provided in the form of data downloaded from a server or data stored on a DVD-ROM. The CPU 210 executes the computer program PG2 to control the printing mechanism 100 in accordance with, for example, print data or direction information (described below) sent from the terminal device 300 during the image process described below, and print an image on a print medium (for example, a sheet).

The printing mechanism 100 performs printing by ejecting ink droplets of the CMYK colors. The printing mechanism 100 includes a print head 110, a head driving unit 120, a main scanning unit 130, and a conveyance unit 140.

Figure 2:
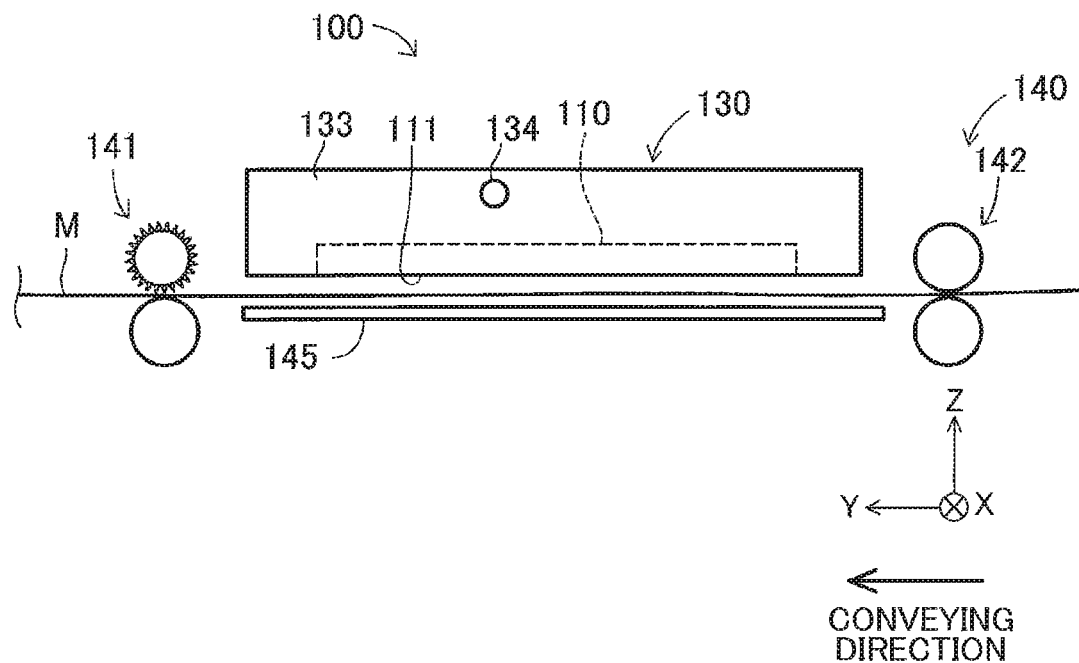
FIG. 2(A) is an explanation diagram illustrating a configuration of a printing mechanism.
FIG. 2(B) is an explanation diagram illustrating a configuration of a print head.
Figure 2:
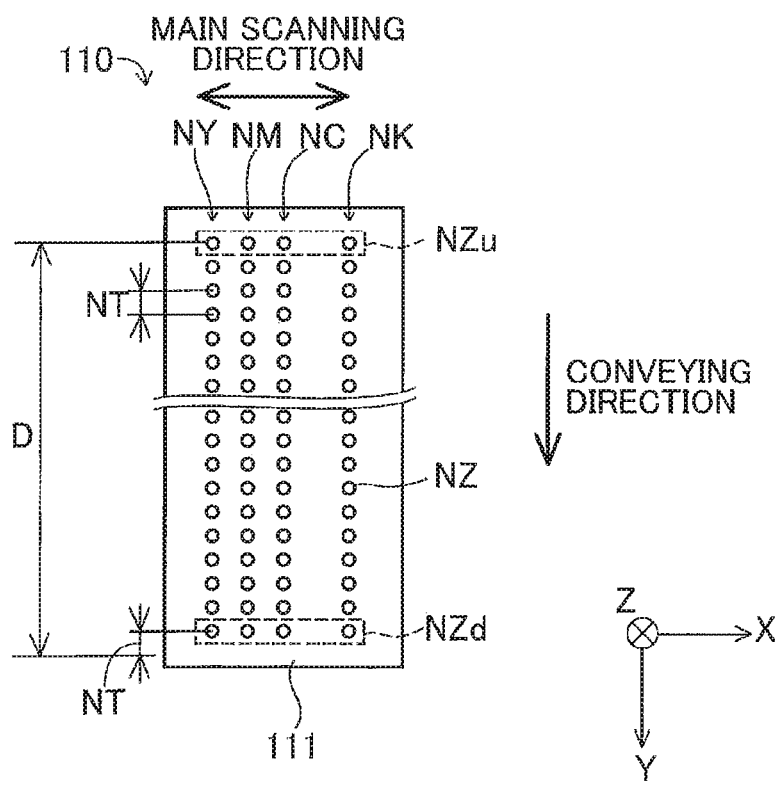

FIG. 2(A) illustrates the overall configuration of the printing mechanism 100. With reference to FIG. 2(A), the main scanning unit 130 includes a carriage 133 carrying the print head 110 and a sliding shaft 134 holding the carriage 133 such that the carriage 133 can reciprocate in the main scanning direction or the X direction in FIG. 2(A). The main scanning unit 130 uses the power from a main scanning motor (not illustrated) to reciprocate the carriage 133 along the sliding shaft 134. Accordingly, the main scanning is performed in such a manner that the print head 110 is reciprocated relative to a sheet M in the main scanning direction. Here, the sheet M is a paper for example.

The conveyance unit 140 supports and conveys the sheet M in the conveying direction (the +Y direction in FIG. 2(A)) orthogonal to the main scanning direction. The conveyance unit 140 includes a sheet table 145, two upstream rollers 142, and two downstream rollers 141, as illustrated in FIG. 2(A). Hereinafter, the upstream side (−Y side) in the conveying direction may also be referred to as "upstream side," and the downstream side (+Y side) in the conveying direction may also be referred to as "downstream side."

The upstream rollers 142 hold the sheet M at a position on the upstream side (−Y side) of the print head 110. The downstream rollers 141 hold the sheet M at a position on the downstream side (+Y side) of the print head 110. The sheet table 145 is disposed at a position between the upstream rollers 142 and the downstream rollers 141 and faces a nozzle face 111 formed in the print head 110. The downstream rollers 141 and the upstream rollers 142 are driven by a conveying motor (not illustrated) to convey the sheet M.

The head driving unit 120 (see FIG. 1) feeds drive signal to the print head 110 to drive the print head 110 while the main scanning unit 130 performs main scanning of the print head 110. The print head 110 ejects ink in accordance with the drive signal onto the sheet conveyed by the conveyance unit 140, to form dots on the sheet.

FIG. 2(B) illustrates the configuration of the print head 110 viewed from the −Z side (from below in FIG. 2(A)). As shown in FIG. 2(B), the nozzle face 111 of the print head 110 has multiple nozzle rows. Each nozzle row includes an array of nozzles. In specific, the nozzle face 111 has nozzle rows NC, NM, NY, and NK respectively ejecting inks of the CMYK colors. Each nozzle row includes a plurality of nozzles NZ having different positions in the conveying direction (+Y direction) one another. The nozzles NZ are disposed at a predetermined pitch NT in the conveying direction (+Y direction). The pitch NT corresponds to the distance between any two nozzles NZ adjacent to each other in the conveying direction. Among the nozzles NZ in the nozzle rows NC, NM, NY, and NK, nozzles NZ disposed on the most upstream side (−Y side) are referred to as "most upstream nozzles NZu." Among the nozzles NZ in the nozzle rows NC, NM, NY, and NK, nozzles NZ disposed at the most downstream side (+Y side) are referred to as "most downstream nozzles NZd." The sum of the distance between a most upstream nozzle NZu and a corresponding most downstream nozzle NZd in the conveying direction and one pitch NT is referred to as "nozzle array length D."

The nozzle rows NC, NM, NY, and NK are disposed apart from each other in the main scanning direction and are disposed at the same position in the sub scanning direction. As shown in FIG. 2(B), the nozzles rows NY, NM, NC, and NK are arranged in this order in the +X direction. For example, in the example illustrated in FIG. 2(B), the nozzle row NM is disposed downstream of the nozzle row NY in the +X direction. Here, the nozzle NY consists of nozzles ejecting Y color ink.

A-2. Overview of Printing

The printing mechanism 100 alternately performs partial print and sub-scanning several times to print an image OI on a sheet M. In the partial print, the print head 110 forms ink dots on the sheet M while the main scanning unit 130 performs main scanning. In the sub-scanning, the sheet M is conveyed in the sub-scanning direction (conveying direction) by the conveyance unit 140.

Figure 3:
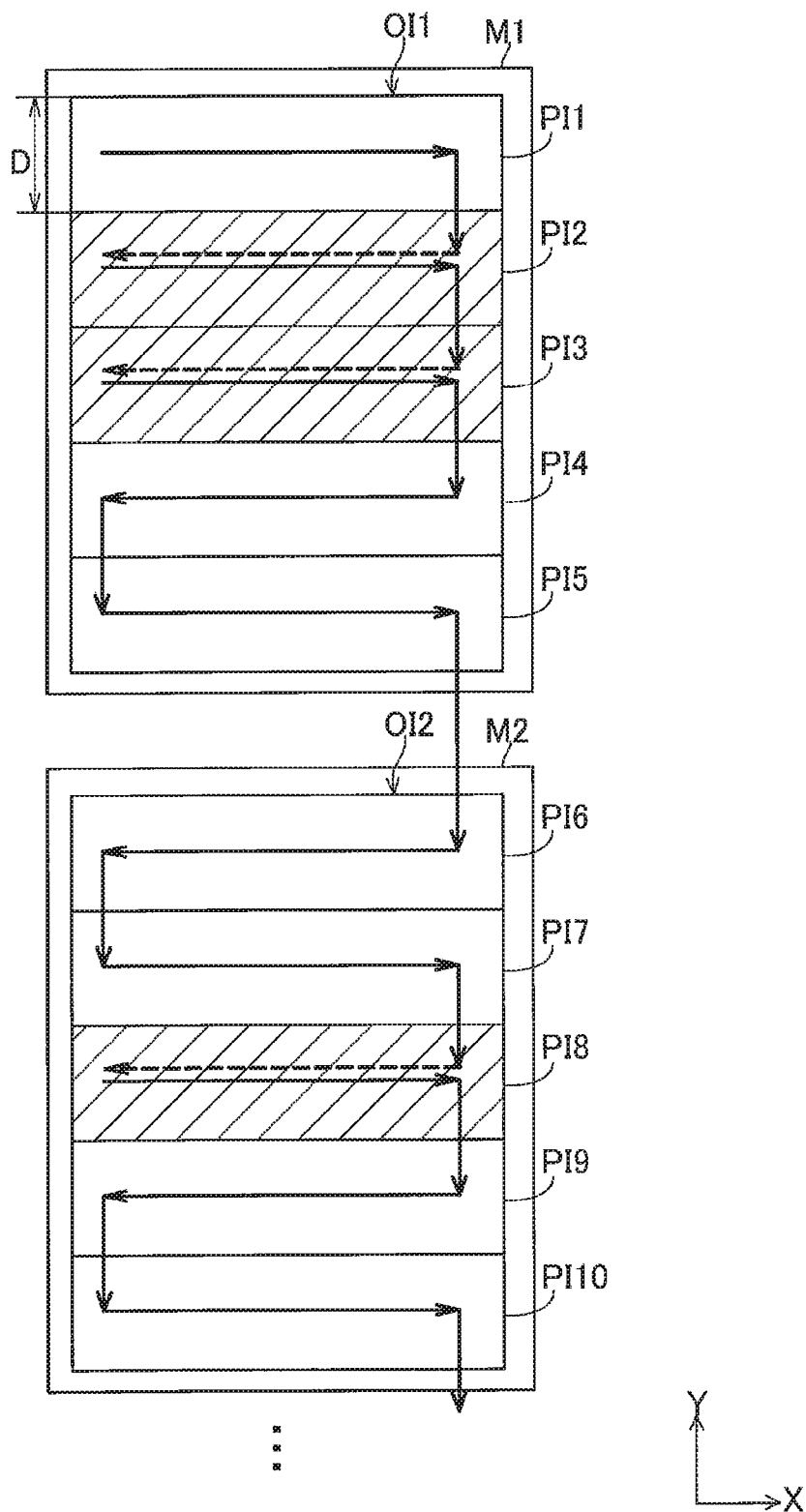
FIG. 3 is an explanation diagram illustrating an operation of the printing mechanism.

FIG. 3 illustrates the operation of the printing mechanism 100. FIG. 3 illustrates the images OI1 and OI2 printed on the respective sheets M1 and M2. Each of the images OI1 and OI2 includes a plurality of partial images PI. In the example illustrated in FIG. 3, the image OH includes partial images PI1-PI5, and the image OI2 includes partial images PI6-PI10. Each partial image PI is an image printed by one partial print. In the partial print, the nozzles NZ ejects inks while the print head 110 is moved in either the forward or the backward with respect to the main scanning direction. Hereinafter, the direction in which the print head 110 is moved during printing is referred to as the printing direction, and the forward in the main scanning direction (+X direction) is referred to the outgoing direction, and the backward in the main scanning direction (-X direction) is referred to as the return direction. The printing direction of partial print is either one of the outgoing direction or the return direction. That is, each partial print is either one of the outgoing print and return print. The outgoing print forms dots while the main scanning in the outgoing direction (+X direction of FIG. 3) is performed. The return print forms dots while the main scanning in the return direction (-X direction of FIG. 3) is performed. In FIG. 3, solid arrows indicating the +X or -X direction are drawn in each partial image. The partial images PI1, PI2, PI3, PI5, PI7, PI8, and PI10 with the solid arrows in the +X direction are outgoing partial images which are printed by the outgoing prints. The partial images PI4, PI6 and PI9 with the solid arrows in the -X direction are return partial images which are printed by the return prints.

In FIG. 3, each arrow extending in the -Y direction from one partial image PI (for example, the partial image PI1) to another partial image PI (for example, the partial image PI2) which is adjacent with the one partial image PI in the -Y direction indicates the conveyance (sub-scanning) of the sheet M. In other words, an arrow in the -Y direction in FIG. 3 indicates the shift of the print head 110 in the -Y direction relative to the sheet M due to the conveyance of the sheet M. The printing according to this embodiment is single pass printing. That is, the length of each partial image in the conveying direction is equal to the nozzle array length D, and the conveyance amount of the sheet M by one conveyance is equal to the nozzle array length D.

As shown in the print head 110 of FIG. 2(B), the nozzle rows NC, NM, NY, and NK for the respective CMYK colors are disposed at different positions in the main scanning direction. Comparing the outgoing print with the return print in a case where dots of the CMYK colors are formed at a predetermined position on a sheet M, an order of formation of the CMYK color dots by the outgoing print is different from an order of formation of the CMYK color dots by the return print. For example, in the example shown in FIG. 2(B), because the nozzle rows NY, NM, NC, and NK are arranged in this order in +X direction, the CMYK color dots are formed in the order of K, C, M, and Y through the outgoing print. In contrast, the CMYK color dots are formed in the order of Y, M, C, and K through the return print. In other words, in regions of the image in which different color dots are overlaid each other, the overlaying order of the CMYK dots differs between the outgoing print and the return print. This difference in the overlaying order may cause the printed outgoing partial image and the printed return partial image to have different color tones even when the outgoing partial image and the return partial image are printed using the same dot data. Such a color difference between the outgoing partial image and the return partial image is referred to as "outgoing/return color difference."

Here, the outgoing profile PF1 described above is used for converting RGB values to CMYK values when generating partial print data for an outgoing print, i.e., print data for a single outgoing print to print an outgoing partial image. That is, the outgoing profile PF1 corresponds to the outgoing direction. The return profile PF2 is used for converting RGB values to CMYK values when generating partial print data for a return print, i.e., print data for a single return print to print a return partial image. That is, the return profile PF2 corresponds to the return direction. Color matching is performed between the outgoing profile PF1 and the return profile PF2 to reduce the outgoing/return color difference described above. Specifically, the profiles PF1 and PF2 are adjusted so that the colors in an outgoing partial image printed based on CMYK values obtained using the outgoing profile PF1 to convert specific RGB values approach the colors in a return partial image printed based on CMYK values obtained using the return profile PF2 to convert the specific RGB values.

However, the outgoing/return color difference cannot always be suppressed sufficiently using the outgoing profile PF1 and the return profile PF2 because the difference is too great for specific colors. The color evaluation information CI (see FIG. 1) is information stipulating weights for each of various RGB values based on their outgoing/return color difference.

Figure 4:
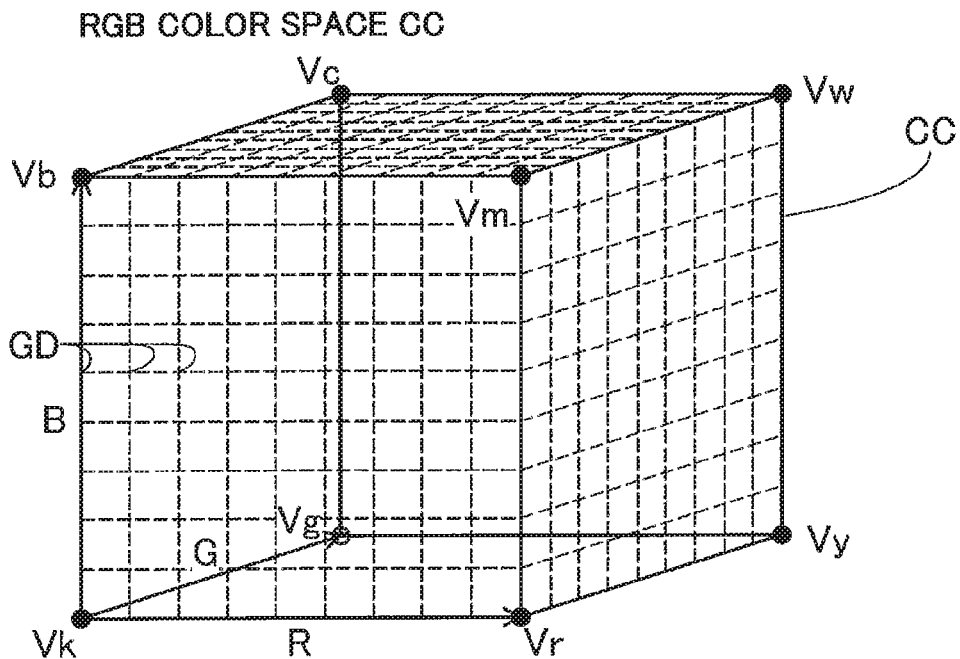
FIG. 4(A) is an explanatory diagram illustrating an RGB color space.
FIG. 4(B) is a table illustrating color evaluation information.

FIGS. 4(A) and 4(B) are explanatory diagrams for the color evaluation information CI. FIG. 4(A) shows an RGB color space CC. A symbol representing a color is assigned to each of the eight vertices in the RGB color space CC. Specifically, the RGB color space CC has a black vertex Vk (0, 0, 0), a red vertex Vr (255, 0, 0), a green vertex Vg (0, 255, 0), a blue vertex Vb (0, 0, 255), a cyan vertex Vc (0, 255, 255), a magenta vertex Vm (255, 0, 255), a yellow vertex Vy (255, 255, 0), and a white vertex Vw (255, 255, 255). The numbers within the parentheses indicate the values of the color components (R, G, B). The R value at each of the grid points GD indicated in FIG. 4(A) is set to one of Q+1 values obtained by dividing the range of R values (between 0 and 255 in this example) into Q equal parts. The G values and the B values are set similarly for each grid point GD. Since Q is 9 in the embodiment, a total of 729 ($9^3$) grid points GD are set in the RGB color space CC.

FIG. 4(B) shows an example of color evaluation information CI. The color evaluation information CI assigns a weight Wt to each set of RGB values corresponding to the 729 grid points GD. Here, an evaluator prints a color patch based on a CMYK value obtained by converting an RGB value for a specific grid point GD using the outgoing profile PF1 with the outgoing direction set as the printing direction and a color patch based on a CMYK value obtained by converting the RGB value for the same grid point GD using the return profile PF2 with the return direction set as the printing direction, for example. The evaluator measures the two printed color patches to obtain their colorimetric values. The colorimetric values are color values in a color space that is not dependent on the printing mechanism 100 or other device. In the embodiment, the colorimetric values are color values in the CIELAB color space (hereinafter called "Lab values"). The evaluator calculates the color difference between the two colorimetric values obtained above and sets the result to the outgoing/return color difference dM corresponding to the specific grid point GD. The evaluator assigns a weight Wt to the specific grid point GD such that the weight Wt is larger for larger outgoing/return color differences dM. By assigning a weight Wt to each of the 729 grid points GD in this way, the evaluator creates the color evaluation information CI.

As described above, the outgoing/return color difference is caused by the different order in which dots are formed over the top of one another between an outgoing partial image and a return partial image. This outgoing/return color difference is larger for specific colors rendered using two of the CMYK ink colors employed in printing (hereinafter called color difference producing colors). Color difference producing colors include green colors rendered using both the C ink and Y ink, for example, and particularly dark greens using a relatively large quantity of both C and Y ink. The color difference producing colors may also include reds rendered using both M ink and Y ink, blues using both C ink and M ink, and grays rendered using C, M, and Y ink. The weights Wt assigned to grid points GD in the color evaluation information CI that correspond to these color difference producing colors are greater than weights Wt assigned to grid points GD corresponding to other colors.

A-3. Image Process

Figure 5:
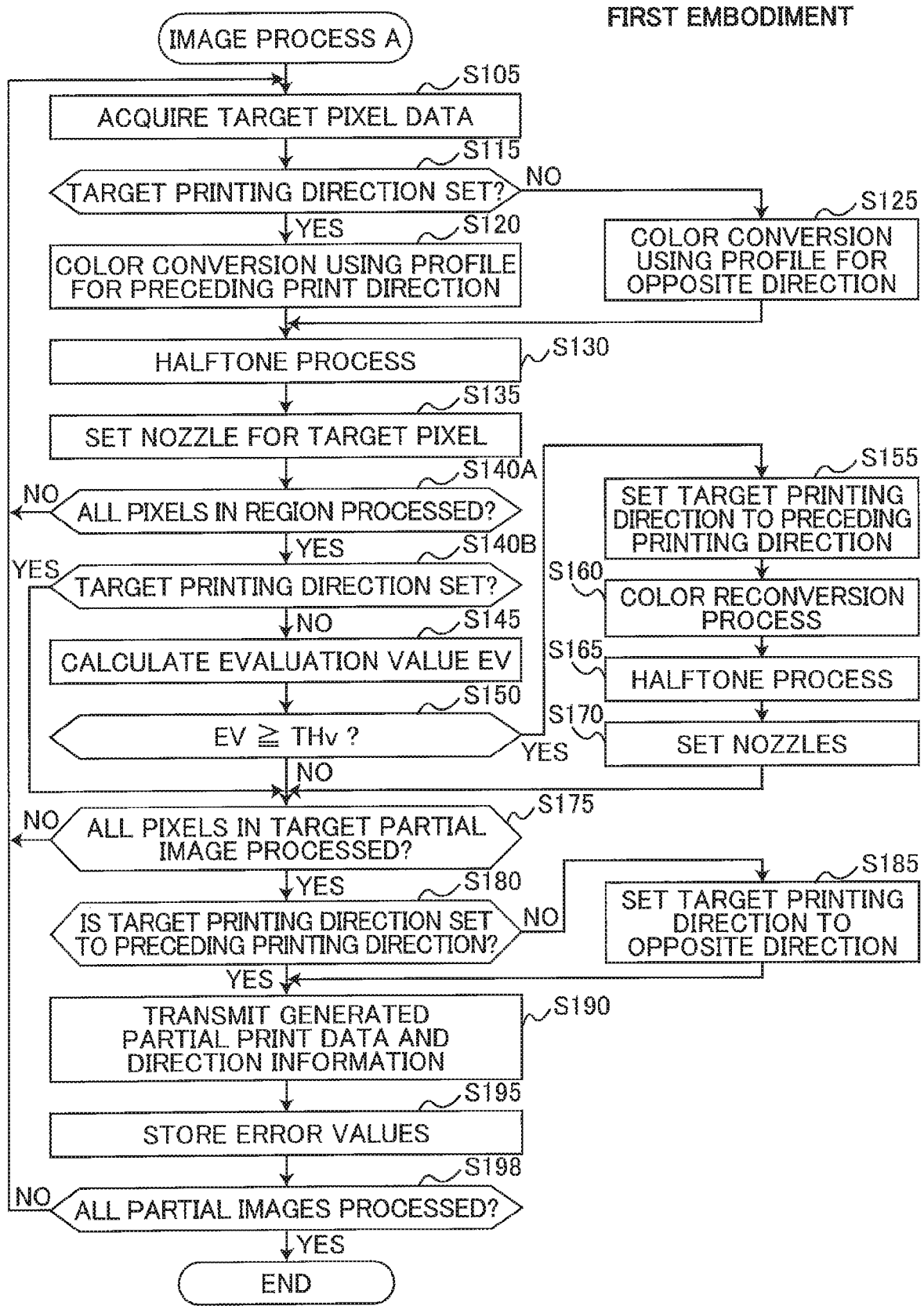
FIG. 5 is a flowchart illustrating an image process A according to the first embodiment.

FIG. 5 is a flowchart illustrating steps in an image process A according to the first embodiment. The CPU 310 of the terminal device 300 (see FIG. 1) starts the image process in FIG. 5 in response to a print command from the user. The print command includes a specification for target image data representing a print image OI (see FIG. 3) to be printed. In this embodiment, the target image data is RGB image data expressing a color for each pixel using RGB value, for example. The target image data includes a plurality of sets of pixel data corresponding to pixels in the target image. When the target image data is not RGB image data, the CPU 310 executes a rasterization process to convert the target image data to RGB image data.

Figure 6:
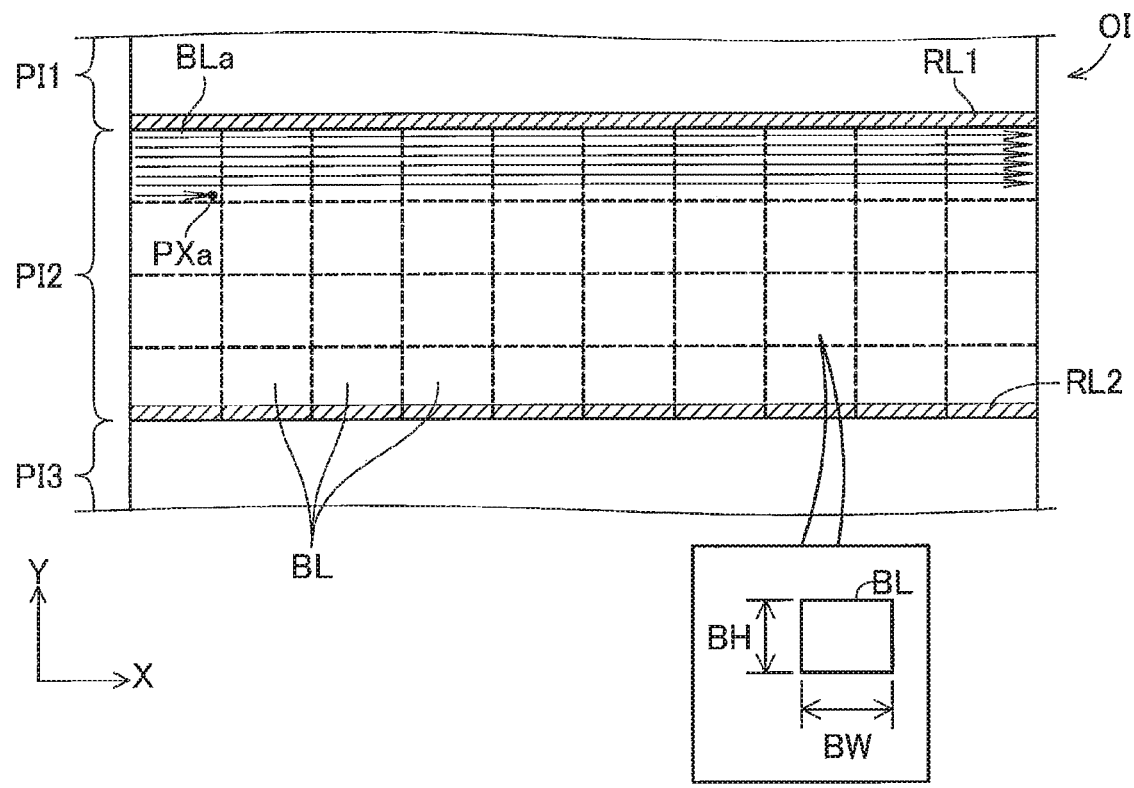
FIG. 6(A) is an explanatory diagram illustrating an order of selecting target pixels in a partial image according to the first embodiment.
FIG. 6(B) is an explanatory diagram illustrating an order of selecting target pixels in a partial image according to a second embodiment.
Figure 6:
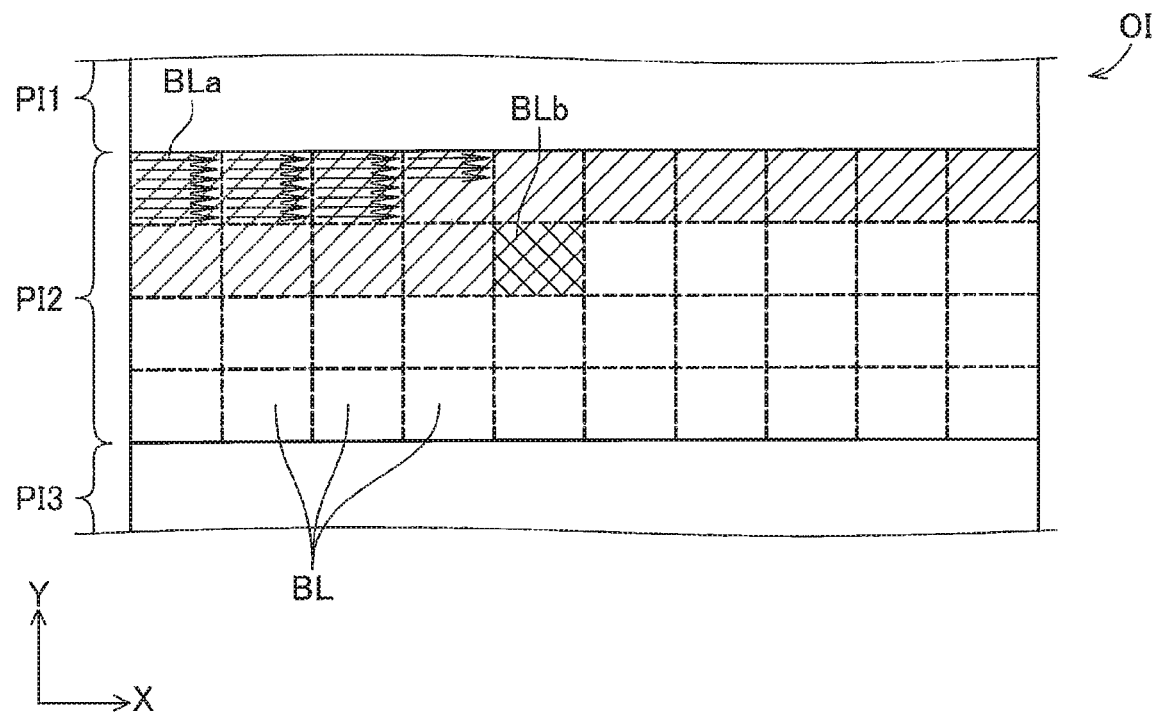

In S105 of FIG. 5, the CPU 310 acquires a single set of target pixel data from among the plurality of sets of pixel data (RGB value) in the target image data. FIG. 6(A) shows a portion of the print image OI1. FIG. 6(A) illustrates three partial images PI1-PI3 of the print image OI1 described above.

The target image represented by the target image data includes a plurality of pixels arranged in a matrix configuration with rows in the X direction and columns in the Y direction. A line formed of a plurality of pixels for one row extending in the X direction will be called a raster line. In the embodiment, the plurality of raster lines in the target image is selected or processed sequentially beginning from the +Y side and progressing toward the −Y side, and the plurality of pixels constituting a selected single raster line is selected or processed sequentially beginning from the −X side and progressing toward the +X side. In the example of FIG. 6(A), the pixels corresponding to partial image PI2 are selected one at a time to be a target pixel, beginning from the pixel in the upper left corner and progressing as indicated by the arrows in FIG. 6(A). The value of each target pixel (RGB value) is acquired as target pixel data.

In S115 the CPU 310 determines whether a target printing direction has been set to the preceding printing direction. Here, the partial image PI to which the current target pixel belongs will be called the target partial image. The target printing direction is the printing direction for a partial print (outgoing direction or return direction) for printing the target partial image. The CPU 310 reaches a YES determination in S115 if the target printing direction was set to the preceding printing direction in S155 described later. Here, the preceding printing direction is the printing direction for the partial print which precedes the partial print for the current target partial image.

If the target printing direction has been set to the preceding printing direction (S115: YES), in S120 the CPU 310 executes a color conversion process on the target pixel data set using the outgoing profile PF1 or the return profile PF2 that corresponds to the preceding printing direction. Through this process, the CPU 310 converts the target pixel data set (RGB value) to a CMYK value.

If the target printing direction has not been set (S115: NO), in S125 the CPU 310 executes a color conversion process on the set of target pixel data using the outgoing profile PF1 or the return profile PF2 that corresponds to the direction opposite the preceding printing direction. Through this process, the CPU 310 converts the set of target pixel data (RGB value) to a CMYK value.

In S130 the CPU 310 executes a halftone process on the converted target pixel data. The halftone process produces data (hereinafter called dot data) specifying the dot formation state for each of the CMYK components of the target pixel. For example, the dot formation state indicates the presence or absence of a dot. Alternatively, the dot formation state may indicate the size of a dot (large, medium, or small) or the absence of a dot. In the embodiment, the halftone process is executed by using a known error diffusion method. Thus, the error values calculated when executing the halftone process on a prescribed number (one or two, for example) of raster lines neighboring the target partial image on the +Y side are needed. In the example of FIG. 6(A), the error values for the prescribed number of raster lines RL1 constituting the −Y edge portion of the partial image PI1 are required when the partial image PI2 is the target partial image. These error values were saved in the buffer region 331 in S195 (described later) for the previous partial image PI1.

In S135 the CPU 310 sets nozzles NZ for the target pixel. In other words, the CPU 310 sets the nozzle NZ used to form a dot for each of the CMYK components when dots are to be formed for the target pixel. A nozzle buffer is allocated in the buffer region 331 for storing dot data used in a target partial print. Dot data (CMYK dot data) corresponding to the target pixel is stored in the nozzle buffer at addresses corresponding to the nozzles NZ set in S135.

In S140A the CPU 310 determines whether all the sets of pixel data for a target determination region have been acquired as target pixel data. As shown in FIG. 6(A), each partial image PI in the print image OI is divided into a plurality of determination regions BL. Each determination region BL has a rectangular shape. The determination regions BL are arranged in a grid configuration with rows extending in the X direction and columns in the Y direction and no gaps between adjacent determination regions BL. Each determination region BL has a predetermined pixel number BH in the Y direction and a predetermined pixel number BW in the X direction. The target determination region is the determination region BL in which the target pixel belongs. For example, if the target pixel is a pixel PXa positioned in the lower right corner of determination region BLa in FIG. 6(A), the CPU 310 determines that all the sets of pixel data for the determination region BLa have been acquired as target pixel data.

If a set of the pixel data for the target determination region has not yet been acquired (S140A: NO), the CPU 310 returns to S105. If all the sets of pixel data for the target determination region have been set (S140A: YES), in S140B the CPU 310 determines whether the target printing direction is set. The CPU 310 determines that the target printing direction has been set when the target printing direction was set to the preceding printing direction in S155 described later (S140B: YES). If YES determination is made in S140B, the CPU 310 proceeds to S175. On the other hand, the CPU 310 determines that the target printing direction has not been set when the target printing direction was not set to the preceding printing direction in S155 (S140B: NO). If NO determination is made in S140B, the CPU 310 proceeds to S145.

In S145 the CPU 310 calculates an evaluation value EV for the target determination region.

Specifically, the CPU 310 sets weights Wt for all of the pixels in the target determination region. The weights Wt are set by referring to the color evaluation information CI described above (see FIG. 4(B)). If the RGB value of a pixel is included in the color evaluation information CI, a weight Wt corresponding to the RGB value of the pixel is set for the pixel. If the RGB value of a pixel is not included in the color evaluation information CI, a weight Wt for the pixel is calculated through an interpolation operation based on the plurality of weights Wt corresponding to the plurality of grid points GD neighboring the RGB value of the pixel (pixel data). The CPU 310 calculates the average of the plurality of weights Wt for the plurality of pixels in the target determination region to be the evaluation value EV for the target determination region. A large evaluation value EV indicates that the outgoing/return color difference for the image in the target determination region is large.

In S150 the CPU 310 determines whether the evaluation value EV for the target determination region is greater than or equal to a threshold THv. If the evaluation value EV is less than the threshold THv (S150: NO), the CPU 310 advances to S175. However, if the evaluation value EV is greater than or equal to the threshold THv (S150: YES), in S155 the CPU 310 sets the target printing direction to the preceding printing direction.

In S160 the CPU 310 executes the color reconversion process. That is, the CPU 310 again performs color conversion on all sets of pixel data that are sets of pixel data of pixels included in the target pixel image and have been processed as target pixel data to this point. Sets of pixel data that have been processed to this point have been converted using one of the outgoing profile PF1 and the return profile PF2 that corresponds to the direction opposite the preceding printing direction in S125. When executing the color reconversion process, the CPU 310 converts colors using one of the outgoing profile PF1 and the return profile PF2 corresponding to the preceding printing direction.

In S165, the CPU 310 re-executes the halftone process. That is, the CPU 310 executes the halftone process again on all the sets of pixel data that were reconverted in S160 to generate sets of dot data corresponding to these sets of pixel data. The halftone process in the embodiment employs an error diffusion method. Similarly to the halftone process in S130, the error values for the prescribed number of raster lines RL1 constituting the −Y edge portion of the partial image PI1, which are stored in S195 for the previous partial image data (described later), are used when re-executing the halftone process on the prescribed number of raster lines neighboring the target partial image on the +Y side.

In S170 the CPU 310 sets the nozzles NZ corresponding to the dot data generated in S165. The regenerated dot data is stored in the nozzle buffer at addresses corresponding to the nozzles NZ set in S170. In this way, dot data previously stored in the nozzle buffer for the target pixel in S135 described above is deleted and overwritten with the dot data regenerated in S165.

In S175 the CPU 310 determines whether all the sets of pixel data for the target partial image data have been processed as target pixel data. The target partial image data is the portion of the target image data corresponding to the target partial image. If the target partial image data includes a set of unprocessed pixel data (S175: NO), the CPU 310 returns to S105. However, if all the sets of pixel data for the target partial image data has been processed as target pixel data (S175: YES), then all the sets of dot data for the target partial image are stored in the nozzle buffer at this time. That is, entire partial print data for printing the target partial image is stored in the nozzle buffer at this time. Accordingly, the CPU 310 advances to S180.

In S180 the CPU 310 determines whether the target printing direction has been set to the preceding printing direction. If the target printing direction has been set to the preceding printing direction (S180: YES), the CPU 310 advances to S190. However, if the target printing direction has not been set (S180: NO), in S185 the CPU 310 sets the target printing direction to the direction opposite the preceding printing direction. Hence, when the partial print data has been completely saved without the target printing direction being set to the preceding printing direction in S155, the CPU 310 sets the target printing direction to the direction opposite the preceding printing direction.

In S190 the CPU 310 transmits the generated partial print data and direction information indicating the set printing direction to the printer 200. When the printer 200 receives the partial print data and the direction information, the CPU 210 of the printer 200 performs a partial print in accordance with the partial print data and the direction information. For example, when the direction information indicates the outgoing direction, the CPU 210 performs the outgoing print to print the target image. When the direction information indicates the return direction, the CPU 210 performs the return print to print the target partial image.

In S195 the CPU 310 saves error values for the prescribed number of raster lines (for example, the lines RL1, or the lines RL2 shown in FIG. 6(B)) in the buffer region 331 which are to be used in the next halftone processes in S130 and S165 for the next partial image set as the target partial image. For example, when the partial image PI2 in FIG. 6(A) is the target partial image, the CPU 310 saves in the buffer region 331 error values for the prescribed number of raster lines RL2 positioned in the −Y edge portion of the partial image PI2.

In S198, the CPU 310 determines whether all the sets of partial image data of the image OI are processed. If any partial image data remains unprocessed (S198: NO), the CPU 310 returns S105. If all the sets of partial image data are processed (S198: YES), the CPU 310 ends the image process A.

Next, the print image OI printed according to the image process A will be described. As shown in FIG. 3, outgoing prints and return prints are alternated as a general rule when executing printing in the embodiment (S125 of FIG. 5). This method can reduce the time required for printing.

According to the image process A, the CPU 310 sets the target printing direction to one of the outgoing direction and the return direction based on the target partial image data (S150, S155, S180, and S185 in FIG. 5). Accordingly, the target partial image is printed in a printing direction suitable for the target partial image being printed, thereby reducing the likelihood of color irregularities generated when printing in different directions.

For example, the CPU 310 sets the target printing direction to the direction opposite the preceding printing direction when determining that the difference in color (i.e., the outgoing/return color difference) produced between a target partial image printed using first partial print data (i.e., one of the outgoing partial image and return partial image) and a target partial image printed using the second partial print data (i.e., the other one of the outgoing partial image and return partial image) is less than a reference. Specifically, when the evaluation value EV for all determination regions BL in the target partial image is less than the threshold (S180 of FIG. 5: NO), the CPU 310 sets the target printing direction to the direction opposite the preceding printing direction (S185 of FIG. 5). Further, when the color difference is greater than or equal to the reference, the CPU 310 sets the target printing direction to the preceding printing direction. Specifically, when the evaluation value EV for one or more determination regions BL in the target partial image is greater than or equal to the threshold (S150 of FIG. 5: YES), the CPU 310 sets the target printing direction to the preceding printing direction (S155 of FIG. 5). Thus, this technique can increase printing speed when the color difference is less than the reference and can suppress a drop in image quality caused by color differences when the color difference is greater than or equal to the reference.

In the example of FIG. 3, the shaded partial images PI2, PI3, and PI8 are determined to have a color difference that is greater than or equal to the reference, while the remaining unshaded partial images PI1, PI4-PI7, PI9, and PI10 are determined to have a color difference less than the reference. As shown in FIG. 3, the shaded partial images PI2, PI3, and PI8 are printed using the same printing direction used when printing the respective preceding partial images PI1, PI2, and PI7. In these cases, a main scan without forming dots is performed between the preceding partial print and the current partial print for printing the current partial image, as indicated by arrows formed with dashed lines in FIG. 3. A main scan performed without forming dots (i.e., without printing a partial image) will be called a non-printing main scan.

While performing these non-printing main scans increases the required printing time relative to printing without performing non-printing main scans, this technique can prevent the outgoing/return color difference described above from becoming noticeable and, hence, can suppress a decline in the quality of the printed images. In the example of FIG. 3, the two partial images PI2 and PI3 are adjacent to each other and both have a color difference greater than or equal to the reference. Therefore, the outgoing/return color difference would be noticeable if both partial images were printed in different printing directions from each other. However, since the partial images PI2 and PI3 are printed in the same printing direction in the embodiment, as indicated in FIG. 3, an outgoing/return color difference is not produced between the partial images PI2 and PI3.

As described above, in the color evaluation information CI, the weights Wt assigned to the color difference producing colors are larger than weights Wt assigned to other colors. Accordingly, the evaluation value EV greater than the threshold for one or more determination regions BL signifies that the target partial image includes one or more color difference producing pixels producing the color differences larger than or equal to a specific threshold value, and an evaluation value EV that is less than the threshold for all determination regions BL signifies that the target partial image does not include color difference producing pixels producing the color differences larger than or equal to a specific threshold value. Color difference producing pixels are those pixels that have the color difference producing colors described above. Thus, the embodiment could be rephrased to indicate that the CPU 310 determines the color difference (outgoing/return color difference) to be greater than or equal to the reference when the target partial image includes one or color difference producing pixels producing color differences greater than or equal to the specific threshold value. In this way, the disclosure can suitably suppress a drop in image quality caused by color differences produced when superimposing two or more colors of ink.

Assuming that the color difference producing color is represented by a specific CMYK value converted from an RGB value by the outgoing profile (for example), the color difference of the color difference producing color may be defined as a difference between first color and second color which are represented by a Lab value, for example. Here, the first color is color printed based on a specific CMYK value when the print head 110 moves in the outgoing direction. The second color (for example, color represented by a Lab value) is color printed based on a specific CMYK value when the print head 110 moves in the return direction. Alternatively, assuming that the color difference producing color is represented by a specific RGB value, the color difference of the color difference producing color may be a difference between third color and fourth color which are represented by a Lab value, for example. Here, the third color is color printed based on a first CMYK value when the print head 110 moves in the outgoing direction. The first CMYK value is obtained by converting the specific RGB value using the outgoing profile PF1. The fourth color (for example, color represented by a Lab value) is color printed based on a second CMYK value when the print head 110 moves in the return direction. The second CMYK value is obtained by converting the specific RGB value using the return profile PF2.

In the image process A, the CPU 310 can execute a first generation process (S125, S130, and S135 of FIG. 5) that includes a first color conversion process (S125 of FIG. 5) on the target partial image data. This first color conversion process is performed using the profile PF1 or PF2 corresponding to the direction opposite the preceding printing direction. Thus, the first generation process generates first partial print data for performing a partial print in the opposite direction from the preceding printing direction. The CPU 310 can also execute a second generation process (S160, S165, S170, S120, S130, and S135 in FIG. 5) that includes a second color conversion process (S160 and S120 in FIG. 5) on the target partial image data. This second color conversion process is performed using the profile PF1 or PF2 corresponding to the preceding printing direction. In this way, the second generation process generates second partial print data for performing a partial print in the preceding printing direction. Subsequently, the CPU 310 outputs the first partial print data to the printer 200 when the target printing direction is set to the direction opposite the preceding printing direction, and outputs the second partial print data to the printer 200 when the target printing direction is set to the preceding printing direction (S190 of FIG. 5).

According to the image process A, the profiles PF1 and PF2 used in the first color conversion process and the second color conversion process are adjusted so that the colors in an outgoing partial image printed based on CMYK values obtained using the outgoing profile PF1 to convert specific RGB values approach the colors in a return partial image printed based on CMYK values obtained using the return profile PF2 to convert the specific RGB values. As a result, it is more likely that the color difference produced between a target partial image printed in an outgoing print and a target partial image printed in a return print will be less than the reference than when using one type of profile for both outgoing prints and return prints, for example, thereby increasing the probability that the target printing direction will be set to the direction opposite the preceding printing direction and improving printing speed for printing using outgoing prints and return prints.

In the image process A, the first generation process begins when the target printing direction is determined to be not set (S115 of FIG. 5: NO). This first generation process is interrupted at the point the target printing direction is set to the preceding printing direction (the same direction used for printing in the preceding partial print; S115 of FIG. 5: YES). If the target printing direction is set to the direction opposite the preceding printing direction (S185 of FIG. 5), the first generation process is executed to the end (is completed) without interruption. The second generation process begins after the target printing direction has been set to the preceding printing direction (S150 of FIG. 5: YES).

Since the first generation process begins at the point the target printing direction is determined to be not set, the first partial print data is quickly generated when the target printing direction is set to the direction opposite the preceding printing direction. Specifically, even when setting the target printing direction takes a relatively long time, for example, printing using the first partial print data can begin quickly if the target printing direction is set to the direction opposite the preceding printing direction, i.e., if printing is performed using the outgoing print and the return print (bidirectional printing). Accordingly, a drop in printing speed can be suppressed. Hence, in a case where the target printing direction is set to the opposite direction from the preceding printing direction, the first partial print data can be generated in the present embodiment more quickly than in the method in which the first generation process and the second generation process are performed simultaneously (as in the third embodiment described later, for example). As described above, the image process A can suppress a decline in printing speed while reducing the generation of color irregularities when printing using outgoing prints and return prints.

Further, if the first generation process and the second generation process are performed simultaneously (as in the third embodiment described later, for example), sufficient space for the buffer region 331 must be allocated in order to store both data generated in the first generation process and data generated in the second generation process. However, in the image process A, the first generation process is interrupted when the target printing direction is set to the preceding printing direction, and the second generation process begins after the target printing direction has been set to the preceding printing direction. Accordingly, space for the buffer region 331 need only be allocated for storing either data generated in the first generation process or data generated in the second generation process. Therefore, the memory capacity of the buffer region 331 required for generating partial print data can be reduced.

The evaluation value EV of the target determination region being greater than or equal to the threshold is a special condition for setting the target printing direction to the preceding printing direction. In the image process A, the CPU 310 uses a portion of the target partial image data (i.e., data corresponding to the determination region BL) to determine whether this special condition has been met (S150 of FIG. 5), and sets the target printing direction to the preceding printing direction (S155 of FIG. 5) when the special condition has been met (S150 of FIG. 5: YES). In this way, the time required for setting the target printing direction to the preceding printing direction can be made shorter than when setting the target printing direction using the entire target partial image data, for example. Since the first generation process is canceled and the second generation process is begun when the target printing direction is set to the preceding printing direction, the time spent performing the first generation process to this point is wasted. However, the image process A can cancel the first generation process and begin the second generation process in the present embodiment more quickly than a method in which the target printing direction is set based on the entire target partial image data. Thus, this method of the present embodiment can suppress the first generation process from being executed unnecessarily and can improve printing speed, even when the target printing direction is set to the preceding printing direction.

In the image process A, the target printing direction is set to the preceding printing direction (S150 and S155 of FIG. 5) when at least one of the determination regions BL satisfies the special condition that the evaluation value EV be greater than or equal to the threshold in the image process A. Therefore, this method can further shorten the time required for setting the target printing direction to the preceding printing direction.

In the image process A, the CPU 310 determines whether the special condition has been met based on all the of sets of special pixel data each time all the sets of special pixel data are acquired as the target pixel data from the plurality of sets of pixel data in the target partial image data (S140-S150 of FIG. 5). Specifically, all the sets of special pixel data are all the sets of pixel data in the determination region BL, and the CPU 310 determines whether the special condition has been met each time all the sets of special pixel data are acquired as the target pixel data. If the CPU 310 determines that the special condition is met after acquiring all the sets of special pixel data (S150 of FIG. 5: YES), the CPU 310 sets the target printing direction to the preceding printing direction (S155 of FIG. 5). If the special condition has not been met upon completing acquisition of all the sets of special pixel data for each determination region in the partial image (S180 of FIG. 5: NO), the target printing direction is set to the direction opposite the preceding printing direction (S185 of FIG. 5). This method can reduce the time required to set the target printing direction when the target printing direction is set to the preceding printing direction.

In the image process A, the CPU 310 begins to execute a unit process for each pixel upon determining that the target printing direction has not been set. The unit process includes the first color conversion process (S125 of FIG. 5), and the first halftone process (S130 of FIG. 5) using first processed data (CMYK values) generated through the first color conversion process. In other words, the first color conversion process and the first halftone process are executed in series for each pixel. Accordingly, the required memory capacity of the buffer region 331 can be less than when the first halftone process is executed after performing the first color conversion process on all the sets of pixel data in the target partial image data (as in the second embodiment described later, for example). When the first halftone process is executed after the first color conversion process is performed on all the sets of pixel data in the target partial image data, sufficient memory must be allocated for the buffer region 331 to store CMYK values for all pixels in the target partial image. However, memory need only be allocated for one pixel worth of CMYK values in the image process A. Further, first partial print data for printing the target partial image has been generated by the time the target printing direction is set to the opposite direction from the preceding printing direction in S185 of FIG. 5. Accordingly, the printer 200 can begin printing the target partial image immediately once the target printing direction has been set to the direction opposite the preceding printing direction. Further, when the first halftone process is executed after performing the first color conversion process on all the sets of pixel data in the target partial image data, one pixel worth of CMYK value must be acquired at a time from the CMYK values stored in the buffer region 331 for the target partial image in order to perform the halftone process. In the image process A, on the other hand, color conversion and the halftone process are executed as a set on one pixel worth of RGB value each time the RGB values is acquired. Accordingly, the time required to generate the first partial print data can be shortened by eliminating the step of acquiring one pixel worth of CMYK value at a time, thereby further improving printing speed.

B. Second Embodiment

Figure 7:
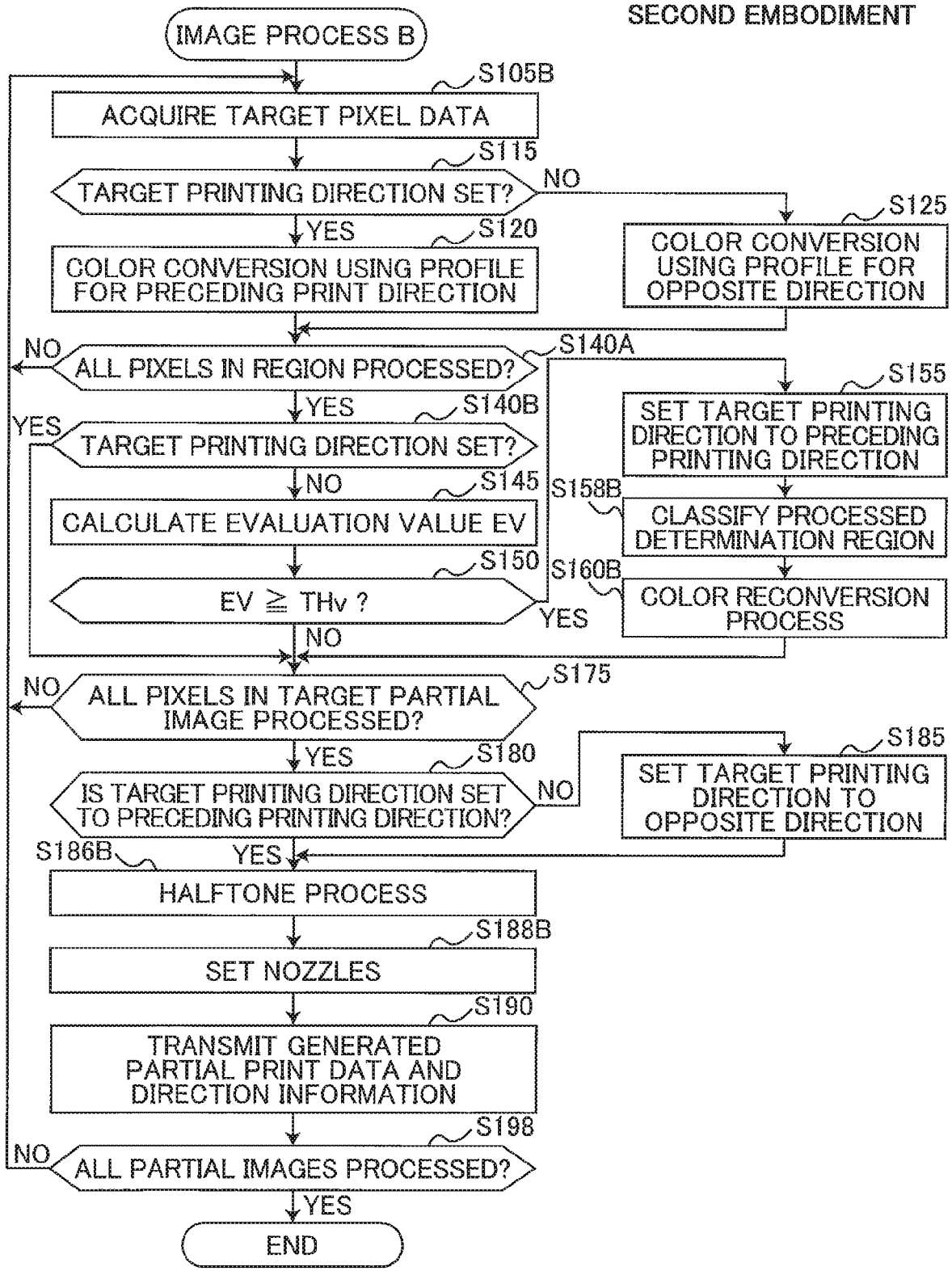
FIG. 7 is a flowchart illustrating an image process B according to a second embodiment.

In the second embodiment, an image process B is executed in place of the image process A of the first embodiment (see FIG. 5). FIG. 7 is a flowchart illustrating steps in the image process B according to the second embodiment. In the flowchart of FIG. 7, steps identical to those in the image process A of FIG. 5 are designated with the same step numbers, while a "B" is appended to the step numbers of steps that differ from the image process A.

In S105B of the image process B in FIG. 7, the CPU 310 acquires data for one target pixel at a time, but the order in which data is acquired differs from that in S105 of the image process A. Specifically, in S105B of the image process B, the CPU 310 sequentially acquires sets of pixel data for all pixels within the target determination region BL as the target pixel data, as illustrated in FIG. 6(B). Specifically, the plurality of lines in the target determination region BL is selected or processed from +Y side to the -Y side. The plurality of pixels in the selected line in the target determination region BL is processed from -X side to the +X side. Subsequently, the CPU 310 acquires sets of pixel data corresponding to pixels in the next determination region BL adjacent to the current determination region BL on the +X side. After the entire row of determination regions BL aligned in the X direction have been processed as target determination regions, the CPU 310 advances to the next row of determination regions BL adjacent on the -Y side of the current row of determination regions BL and sequentially processes this row of determination regions BL beginning from the -X end. As will be described later, the target pixel data can be acquired in this order because a halftone process using the error diffusion method is executed after performing color conversion on all the sets of pixel data in the target partial image data.

In the image process B of FIG. 7, steps S130 and S135 of the image process A have been omitted. Hence, in the image process B the CPU 310 advances directly to S140A after performing the color conversion process on the target pixel data in S120 or S125.

Further, after the target printing direction has been set to the preceding printing direction in S155, steps S158B and S160B in the image process B of FIG. 7 are executed in place of steps S160-S170 in FIG. 5.

In S158B the CPU 310 sets each of one or more processed determination regions BL as one of a determination region BL that is to undergo color reconversion and a determination region BL that is not to undergo color reconversion. Here, each processed determination region BL is a determination region BL to which S125 is performed at this time among the determination regions BL in the target partial image. For example, when the target determination region is determination region BLb in FIG. 6(B), the CPU 310 determines that the evaluation value EV for the target determination region is greater than or equal to the threshold THv (S150 of FIG. 7: YES). In this case, in S158B the CPU 310 sets each of the processed determination regions BL indicated by shading in FIG. 6(B) as either a determination region BL that will be subjected to color reconversion or a determination regions BL that will not be subjected to color reconversion. Specifically, the CPU 310 sets each of the processed determination regions BL whose corresponding evaluation value EV is greater than or equal to a threshold THs as a determination region BL to be subjected to the color reconversion. Here, the threshold THs is smaller than the threshold THv. The CPU 310 sets each of those determination regions BL whose corresponding evaluation value EV is less than the threshold THs as a determination region BL that is not to be subjected to the color reconversion.

In S160B the CPU 310 executes the color reconversion process on sets of pixel data for all pixels in those processed determination regions BL set as determination regions BL to be subjected to color reconversion. The CPU 310 does not executes the color reconversion process on pixel data for pixels in those processed determination regions BL set as determination regions BL not to be subjected to the color reconversion. Just as in S160 of FIG. 5, when executing the color reconversion the CPU 310 uses the outgoing profile PF1 or the return profile PF2 corresponding to the preceding printing direction. The previously converted pixel data (CMYK values) stored in the buffer region 331 that correspond to pixels in determination regions BL specified as determination regions BL to be subjected to the color reconversion are overwritten with the CMYK values generated when color reconversion is executed. CMYK values in the buffer region 331 that correspond to pixels in determination regions BL not set as determination regions BL to be subjected to the color reconversion are not overwritten.

In the image process B, step S186B is executed after the color conversion process or the color reconversion process has been performed on the entire target partial image data, i.e., after S180 or S185.

In S186B the CPU 310 executes the halftone process on all sets of pixel data (CMYK values) produced through the color conversion process or the color reconversion process on the target partial image data. Through this process, the CPU 310 generates all sets of dot data corresponding to the target partial image data. Specifically, the CPU 310 executes a first halftone process when the target printing direction is set to the direction opposite the preceding printing direction in S185 and executes a second halftone process when the target printing direction is set to the preceding printing direction in S155. The first halftone process is executed using sets of processed data (CMYK values) generated in the first color conversion process (S125 of FIG. 7). The second halftone process is executed using the sets of processed data (CMYK values) generated in the second color conversion process (S160B and S120 of FIG. 7) executed after the target printing direction was set, and using the sets of the processed data generated in the first color conversion process (S125 of FIG. 7) that correspond to determination regions BL not subjected to the color reconversion process. In S188B the CPU 310 sets nozzles NZ corresponding to all the sets of dot data in the target partial image data. Through this process, the CPU 310 generates partial print data for printing the target partial image. Specifically, the CPU 310 generates first partial print data when the target printing direction is set to the opposite direction from the preceding printing direction, and generates second partial print data when the target printing direction is set to the preceding printing direction. Similarly to S185, in S186B the CPU 310 saves error values in the buffer region 331 which are to be used in the next halftone process in S186B for the next partial image set as the target partial image.

The remaining steps in the image process B of FIG. 7 are identical to those in the image process A of FIG. 5.

According to the image process B of the second embodiment described above, the halftone process (S186B of FIG. 7) is begun on the target partial image data after completing the color conversion process or the color reconversion process. Specifically, when the target printing direction is set to the direction opposite the preceding printing direction in S185, the CPU 310 executes the first halftone process after setting the target printing direction to the direction opposite the preceding printing direction. If the target printing direction is set to the preceding printing direction in S155, the CPU 310 executes a second generation process (S125, S158B, S160B, S120, S186B and S188B) that includes the second halftone process after setting the target printing direction to the preceding printing direction. This method can avoid the execution of unnecessary halftone processes, regardless of whether the target printing direction is set to the direction opposite the preceding printing direction or is set to the preceding printing direction. In other words, only the process for converting the color is re-executed when the target printing direction is set to the preceding printing direction, thereby suppressing a drop in printing speed when the target printing direction is set to the preceding printing direction.

Further, when the target printing direction is set to the preceding printing direction (S155 of FIG. 7) in the image process B, the CPU 310 sets a plurality of sets of usable data (S158B of FIG. 7) from the sets of processed data (CMYK values) generated in the canceled first color conversion process (S125 of FIG. 7), and executes the second color conversion process on a plurality of sets of data not corresponding to the usable data. The CPU 310 does not execute the second color conversion process on a plurality of sets of data corresponding to the sets of usable data. When the target printing direction is set to the preceding printing direction, the CPU 310 generates second partial print data (S186B and S188B) using CMYK values generated through the second color conversion process (S120 and S160B of FIG. 7) and the usable CMYK values generated in the canceled first color conversion process (or a canceled first generation process (S125, 186B, S188B)). Thus, since the CPU 310 does not execute the second color conversion process on sets of data corresponding to the sets of usable data, the image process B can shorten the time required for printing when the printing direction is set to the preceding printing direction.

As described above, the usable CMYK values are CMYK values corresponding to determination regions BL having the evaluation value EV less than the threshold THs. The CMYK value corresponding to the determination region BL that has the evaluation value EV less than the threshold THs may be called data corresponding to an area whose difference (outgoing/return color difference) between color printed by an outgoing print and color printed by a return print is determined to be less than or equal to the reference. Thus, the second color conversion process is only omitted in areas determined not to produce a strong color difference between color printed when using CMYK values generated through the first color conversion process (when using a profile for a direction different from the target printing direction) and color printed when using CMYK values generated through the second color conversion process. Therefore, this method can suppress a drop in quality in the printed image despite omitting a portion of the second color conversion process.

Further, in S105B of the image process B, target pixel data is acquired in the order shown in FIG. 6(B). Thus, determinations using the evaluation value EV of determination regions BL positioned on the −X side, such as the determination regions BLa and BLb in FIG. 6(B), can be executed more quickly than when the target pixel data is acquired according to the order shown in FIG. 6(A). Accordingly, the time required for setting the target printing direction can be shortened when the target printing direction is set to the preceding printing direction (S155). Hence, this method can reduce the amount of processing performed for needlessly executing the first generation process when the target printing direction is set to the preceding printing direction.

Here, the outgoing/return color difference is more likely produced when using a profile for a direction different from the target printing direction than when using the profile for the target printing direction. Therefore, it is preferable to determine more precisely that the color of an image in the determination region BL is a color not susceptible to producing an outgoing/return color difference when setting usable data. In S158B of the image process B, the threshold THs used for setting usable data is smaller than the threshold THv used for setting the target printing direction to the preceding printing direction in S150. This configuration can appropriately suppress a drop in quality in the printed image.

C. Third Embodiment

In the third embodiment, the CPU 310 is provided with a plurality of logical processors that are assigned to and simultaneously process two or more threads. Accordingly, the CPU 310 has a function for improving overall processing speed (also called a multithreading function). The plurality of logical processors may be implemented by a plurality of physical cores, a plurality of logical cores provided by a single physical core, or a combination of these. One technology known in the art in which a single physical core provides a plurality of logical cores is Hyper-Threading Technology developed by Intel (registered trademark).

Figure 8:
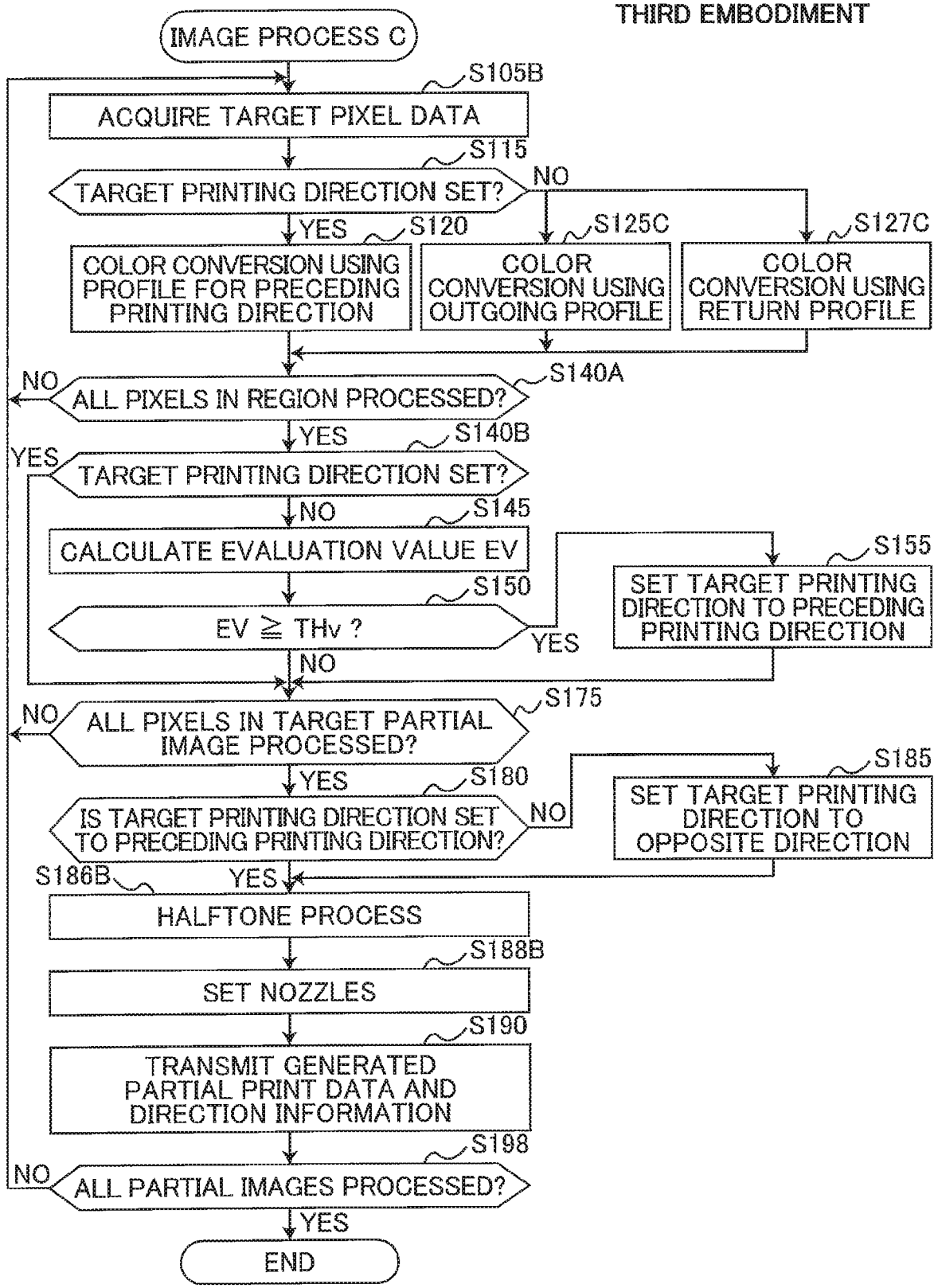
FIG. 8 is a flowchart illustrating an image process C according to a third embodiment.

In the third embodiment an image process C is executed in place of the image process A of FIG. 5 and the image process B of FIG. 7. FIG. 8 is a flowchart illustrating steps in the image process C according to the third embodiment. Steps in the flowchart of FIG. 8 that are identical to those in the image process B of FIG. 7 are designated with the same step numbers, while a "C" is appended to the step numbers of steps different from those in the image process B.

When the CPU 310 determines in S115 of FIG. 8 that the target printing direction has not been set to the preceding printing direction (S115: NO), the CPU 310 uses its multithreading function to execute steps S125C and S127C in parallel in place of S125 of FIG. 7.

In S125C the CPU 310 performs color conversion on the target pixel data using the outgoing profile PF1 to generate CMYK values for an outgoing print (hereinafter, referred to as outgoing CMYK values). In S127C the CPU 310 performs color conversion on the target pixel data using the return profile PF2 to generate CMYK values for a return print (hereinafter, referred to as return CMYK values). These sets of CMYK values are stored in different areas of the buffer region 331.

In the image process C of FIG. 8, the CPU 310 does not execute S158B and S160B in FIG. 7 after setting the target printing direction to the preceding printing direction in S155.

When the printing direction is set to the preceding printing direction in S155, the CPU 310 uses the one of the outgoing CMYK values and the return CMYK values corresponding to the set printing direction (the preceding printing direction) for the partial print data of the current target partial image. In this case, the CPU 310 may delete remaining one of the outgoing CMYK values and the return CMYK values not corresponding to the set printing direction.

When the printing direction is set to the direction opposite to the preceding printing direction in S185, the CPU 310 uses the one of the outgoing CMYK values and the return CMYK values corresponding to the set printing direction. In this case, the CPU 310 may delete remaining one of the outgoing CMYK values and the return CMYK values not corresponding to the set printing direction.

Accordingly, while the target printing direction has not been set to the preceding printing direction in the image process C, the CPU 310 continues to generate both outgoing CMYK values and return CMYK values in S125C and S127C, respectively, and to store these values in the buffer region 331 until the target printing direction is set to the preceding printing direction in S155. Once the printing direction has been set to the preceding printing direction, in S120 the CPU 310 begins generating only those outgoing CMYK values or return CMYK values that correspond to the preceding printing direction while halting the generation of CMYK values corresponding to the direction opposite the preceding printing direction.

If the target printing direction is set to the direction opposite the preceding printing direction in S185 of the image process C, the CPU 310 has generated both outgoing CMYK values and return CMYK values in S125C and S127C, respectively, for the entire target partial image.

As in the image process B of FIG. 7, the CPU 310 executes the halftone process in S186B of the image process C after the color conversion process has been performed for entire target partial image data, i.e., after step S180 or S185.

That is, when the target printing direction is set to the direction opposite the preceding printing direction in S185, in S186B the CPU 310 executes the halftone process on CMYK partial image data configured of the outgoing CMYK values or return CMYK values that correspond to the direction opposite the preceding printing direction, thereby generating first partial print data for printing the target partial image in the direction opposite the preceding printing direction.

When the target printing direction is set to the preceding printing direction in S155, in S186B the CPU 310 executes the halftone process on CMYK partial image data having the outgoing CMYK values or return CMYK values that correspond to the preceding printing direction, thereby generating second partial print data for printing the target partial image in the preceding printing direction.

According to the image process C described above, the CPU 310 begins executing a first generation process for generating first partial print data and a second generation process for generating second partial print data in parallel from the time that the target printing direction is determined not to be set (S125C and S127C of FIG. 8). Therefore, the CPU 310 can generate partial print data relatively quickly, regardless of whether the target printing direction is set to the preceding printing direction or not. Accordingly, the CPU 310 can generate partial print data quickly, even when a relatively long time is required to set the target printing direction, for example, thereby improving printing speed.

Further, once the CPU 310 determines that the target printing direction has been set to the preceding printing direction in the image process C (S115 of FIG. 8: YES), the CPU 310 begins executing color conversion using only the profile corresponding to the preceding printing direction (S120 of FIG. 8) while halting color conversion using the other profile. Thus, when the target printing direction has been set to the preceding printing direction, the CPU 310 interrupts the first generation process at that point and completes only the second generation process. On the other hand, after the target printing direction has been set to the direction opposite the preceding printing direction (S185 of FIG. 8), the CPU 310 executes the halftone process on CMYK partial image data generated through color conversion using the profile corresponding to the direction opposite the preceding printing direction (S186B of FIG. 8) and does not execute a halftone process on CMYK partial image data generated through color conversion using the other profile. Hence, when the target printing direction is set to the direction opposite the preceding printing direction, the CPU 310 interrupts the second generation process at that time and completes only the first generation process. In this way, since the CPU 310 executes only one of the first generation process and the second generation process after the target printing direction has been set, the CPU 310 can reduce processing load for generating partial print data.

Further, by using the multithreading function of the CPU 310 to process a portion of the first generation process and a portion of the second generation process in parallel, the method of the image process C can accelerate the generation of partial print data.

D. Fourth Embodiment

Figure 9:
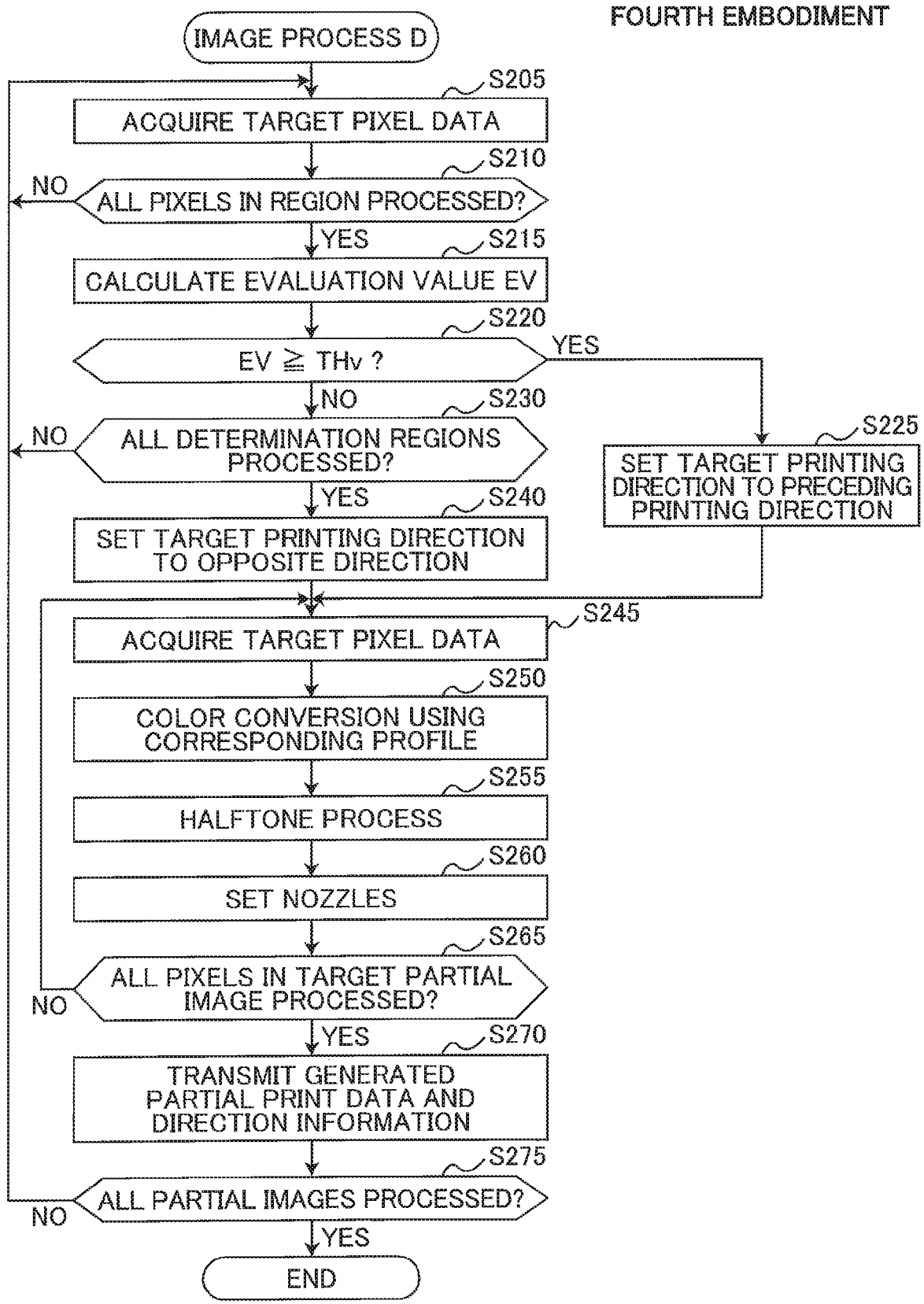
FIG. 9 is a flowchart illustrating an image process D according to a fourth embodiment.

In the fourth embodiment, the CPU 310 executes an image process D in place of the image process A of FIG. 5, the image process B of FIG. 7, and the image process C of FIG. 8. FIG. 9 is a flowchart illustrating steps in the image process D according to the fourth embodiment.

As in S105 of FIG. 8, in S205 of FIG. 9 the CPU 310 acquires target pixel data in the order shown in FIG. 6(B), for example. However, in the fourth embodiment the CPU 310 selectively acquires some of the pixels in the target determination region as the target pixel data rather than acquiring all pixels in the target determination region. As described above, the target determination region is the determination region BL (see FIG. 6(B)) to which the target pixel data belongs. For example, the CPU 310 acquires, from the sets of pixel data, only sets of data for pixels having odd numbered X coordinates and Y coordinates corresponding to the target determination region to be the target pixel data. This method can reduce the processing time required to set the target printing direction.

In S210 the CPU 310 determines whether all sets of pixel data, which are acquisition targets, have been acquired from the plurality of sets of pixel data corresponding to the target determination region. In the above example, the CPU 310 determines whether sets of data for all pixels having odd numbered X coordinates and Y coordinates have been acquired from the sets of pixel data corresponding to the target determination region.

If any of the sets of pixel data, which are acquisition targets, have not yet been acquired (S210: NO), the CPU 310 returns to S205. Once all the sets of pixel data, which are acquisition targets, have been acquired (S210: YES), in S215 the CPU 310 calculates the evaluation value EV for the target determination region by using all the acquired sets of pixel data. In S220 the CPU 310 determines whether this evaluation value EV is greater than or equal to the threshold THv.

If the evaluation value EV is greater than or equal to the threshold THv (S220: YES), in S225 the CPU 310 sets the target printing direction to the preceding printing direction and advances to S245. However, if the evaluation value EV is less than the threshold THv (S220: NO), in S230 the CPU 310 determines whether all determination regions BL in the target partial image have been processed. While there remain unprocessed determination regions (S230: NO), the CPU 310 returns to S205. Once all determination regions BL in the target partial image have been processed (S230: YES), in S240 the CPU 310 sets the target printing direction to the direction opposite the preceding printing direction and advances to S245.

As in S105 of FIG. 5, in S245 of the fourth embodiment the CPU 310 acquires target pixel data in the order shown in FIG. 6(A), for example. In S250 the CPU 310 converts this target pixel data using the outgoing profile PF1 or the return profile PF2 corresponding to the target printing direction set in S225 or S240. In S255 the CPU 310 executes the halftone process on the converted target pixel data. Similarly to S185, in S255 the CPU 310 saves error values in the buffer region 331 which are to be used in the next halftone process in S255 for the next partial image set as the target partial image. In S260 the CPU 310 sets nozzles NZ corresponding to the target pixel.

In S265 the CPU 310 determines whether all the sets of pixel data in the target partial image data have been processed as target pixel data. If the target partial image data includes any set of unprocessed pixel data (S265: NO), the CPU 310 returns to S245. Once all the sets of pixel data in the target partial image data have been processed as target pixel data (S265: YES), in S270 the CPU 310 transmits the partial print data generated above and direction information specifying the target printing direction set above to the printer 200. When the printer 200 receives this partial print data and the direction information, the CPU 210 of the printer 200 executes a partial print according to the partial print data and the direction information.

In S275 the CPU 310 determines whether all the sets of partial image data in the print image OI, which are a target for print, have been processed. If there remain any unprocessed partial image data (S275: NO), the CPU 310 returns to S205. When all the sets of partial image data have been processed (S275: YES), the CPU 310 ends the image process D.

According to the image process D described above, first the target printing direction is set in S205-S240, after which a first generation process or a second generation process corresponding to the set target printing direction is executed in S245-S265. This method avoids needlessly executing the first generation process when the target printing direction is set to the preceding printing direction, and avoids needlessly executing the second generation process when the target printing direction is set to the direction opposite the preceding printing direction. Thus, this method can achieve the same printing speed irrespective of which target printing direction is set.

Further, since the first generation process and the second generation process are not executed in parallel in the fourth embodiment, both data generated according to the first generation process and data generated according to the second generation process need not be stored in the buffer region 331. Hence, the fourth embodiment requires a smaller capacity of memory for the buffer region 331 than the image process C in the third embodiment, for example.

E. Fifth Embodiment

In the fifth embodiment the CPU 310 appropriately determines which process to use from among the image process A in FIG. 5, the image process C in FIG. 8, and the image process D in FIG. 9. FIG. 10 is a flowchart illustrating steps in the process according to the fifth embodiment.

The CPU 310 starts the process of FIG. 10 in response to a print command from the user, for example. In S310 the CPU 310 determines whether the CPU 310 itself possesses the multithreading function described above. For example, the system information of the operating system includes information specifying the number of logical processors, which indicates the number of threads that the CPU 310 can process simultaneously. The CPU 310 references this system information to identify the number of logical processors that it possesses. If the CPU 310 possesses two or more logical processors, the CPU 310 determines that the CPU 310 possesses a multithreading function. When the CPU 310 possesses a single logical processor, the CPU 310 determines that the CPU 310 does not possess a multithreading function. As a variation, the CPU 310 may determine that the CPU 310 possesses a multithreading function when the CPU 310 has two or more physical cores and that the CPU 310 does not possess a multithreading function when the CPU 310 has only a single physical core.

The CPU 310 advances to S320 when the CPU 310 possesses the multithreading function (S310: YES). The CPU 310 advances to S330 when the CPU 310 does not possess the multithreading function (S310: NO).

In S320 the CPU 310 determines whether there remain any unprocessed print jobs for the printer 200. An unprocessed print job includes partial print data for a partial print not yet executed by the printer 200. The CPU 310 may query the printer 200 to determine if the printer 200 has any unprocessed print jobs, for example. The CPU 310 then determines whether the printer 200 has any unprocessed print jobs based on the response acquired from the printer 200 in response to the query. The CPU 310 advances to S340 if the printer 200 has unprocessed print jobs (S320: YES). The CPU 310 advances to S330 if the printer 200 does not have any unprocessed print jobs (S320: NO).

In S330 the CPU 310 determines whether the primary objects in the print image OI to be printed based on the print command are text or photos and drawings. The CPU 310 makes this determination based on the extension for the image data (image file) representing the print image OI. Specifically, the CPU 310 determines that the primary objects in the print image OI are text when the extension of the image file is a first extension type. The CPU 310 determines that the primary objects are drawings or photos when the extension for the image file is a second extension type. The first extension type includes the extensions ".txt," ".doc," and ".pdf," for example. The second extension type includes ".jpg" and ".bmp," for example. The CPU 310 advances to S350 when determining that the primary objects in the print image OI are text (S330: YES). The CPU 310 advances to S340 when determining that the primary objects in the print image OI are photos or drawings (S330: NO).

In S340 the CPU 310 acquires the available memory capacity for use as the buffer region 331 when generating partial print data. In S345 the CPU 310 determines whether the available memory capacity acquired in S340 is greater than or equal to a threshold THm. The threshold THm is set to a capacity equivalent to 2 times the volume of CMYK image data for a single partial image, for example. The CPU 310 advances to S360 when the available memory capacity is greater than or equal to the threshold THm (S345: YES). The CPU 310 advances to S370 when the available memory capacity is less than the threshold THm (S345: NO).

In S350 the CPU 310 executes the image process A in FIG. 5. In S360 the CPU 310 executes the image process C of FIG. 8. In S360 when the CPU 310 does not possess the multithreading function, the CPU 310 executes the processes S125C and S127C in parallel without using the multithreading function. In S370 the CPU 310 executes the image process D of FIG. 9.

Here, the CPU 310 uses its multithreading function when the CPU 310 possesses the multithreading function and when the image process D of FIG. 9 is to be executed. For example, the CPU 310 first executes the process to set the target printing direction for the first partial print (S205-S240 of FIG. 9). Once the target printing direction has been set for a partial print executed first time among partial prints for the print image OI, thereafter the CPU 310 uses its multithreading function to execute in parallel a process to set a target printing direction for the $(n+1)^{th}$ partial print (S205-S240 of FIG. 9) and a process to generate partial print data for the $n^{th}$ partial print (S245-S275 of FIG. 9). Here, n is an integer of 1 or greater.

According to the fifth embodiment described above, the CPU 310 executes the image process C (S360 of FIG. 10) in which the CPU 310 begins performing the first generation process and the second generation process from the time the CPU 310 determines that the target printing direction has not been set when the available memory capacity is greater than or equal to the threshold THm (S345 of FIG. 10: YES). In other words, the CPU 310 executes an image process requiring a relatively large memory capacity in this case. If the available memory capacity is less than the reference (S345 of FIG. 10: NO) then the CPU 310 executes the image process D (S370 of FIG. 10) in which the CPU 310 first sets the target printing direction and then begins performing the first generation process or the second generation process corresponding to the set target printing direction. In other words, the CPU 310 executes an image process that requires a relatively small memory capacity in this case. As a result, the CPU 310 can execute a suitable generation process for the available memory capacity.

Further, when the CPU 310 possesses the multithreading function in the fifth embodiment (S310 of FIG. 10: YES), the CPU 310 executes one of the image process C and the image process D (S360 and S370 of FIG. 10) on the condition that the printer 200 has unprocessed print jobs. The image process C can be called the process in which the CPU 310 begins executing the first generation process and the second generation process in parallel using multithreading from the moment the target printing direction is not set. The image process D can be called the process in which the CPU 310 uses multithreading to execute a process for setting the printing direction for the next partial print and one of the first generation process and the second generation process corresponding to the set target printing direction in parallel. Hence, in these cases the CPU 310 executes an image process that achieves better processing speed when multithreading is possible than when multithreading is not possible. When the CPU 310 has no multithreading function (S310 of FIG. 10: NO), the CPU 310 executes the image process A (S350 of FIG. 10) in which the CPU 310 begins the first generation process but not the second generation process when determining that the target printing direction has not been set on the condition that the primary objects are text. Hence, in this case the CPU 310 executes an image process capable of generating partial print data more quickly than other image processes when the target printing direction is set to the direction opposite the preceding printing direction, despite not using multithreading. Accordingly, the CPU 310 can execute a more suitable image process based on whether the CPU 310 has the capacity for multithreading.

When the printer 200 has unprocessed print jobs in the fifth embodiment (S320 of FIG. 10: YES), the CPU 310 executes one of the image process C and the image process D (S360 and S370 of FIG. 10). In other words, since the printer 200 cannot start printing immediately in this case, the CPU 310 executes an image process capable of generating stable partial print data with no great difference in processing time, regardless of whether the target printing direction is set to the direction opposite the preceding printing direction or to the preceding printing direction. If the printer 200 does not have unprocessed print jobs (S320 of FIG. 10: NO), the CPU 310 executes the image process A. Hence, since the printer 200 can begin printing immediately in this case, the CPU 310 executes the image process A, which can potentially generate partial print data most quickly. Here, the image process A can generate partial print data most quickly if the target printing direction is the direction opposite the preceding printing direction. Accordingly, the CPU 310 can execute a more suitable image process based on the existence of print jobs.

Further, when the image data for the print image OI is identified to be image data whose primary objects are drawings or photos in the fifth embodiment (S330 of FIG. 10: NO), the CPU 310 executes one of the image process C and the image process D (S360 and S370 of FIG. 10). Since drawings and photos have greater potential than text to include the color difference producing colors described above, there is a relatively high probability in this case that the target printing direction will be set to the preceding printing direction. Accordingly, the CPU 310 executes the image process C or the image process D, which do not generate data unnecessarily as much as the image process A when the target printing direction is set to the preceding printing direction. When the image data is identified to be image data whose primary objects are text (S330 of FIG. 10: YES), the CPU 310 executes the image process A. Since text has a lower potential than drawings and photos to include the color difference producing colors described above, there is a relatively high probability that the target printing direction will be set to the direction opposite the preceding printing direction. Accordingly, the CPU 310 executes the image process A, which is capable of generating partial print data most quickly when the target printing direction is set to the direction opposite the preceding printing direction. Accordingly, the CPU 310 can execute a more suitable image process based on the type of image data representing the print image OI.

F. Variations of the Embodiments (1) In S105 of the image process A described above (see FIG. 5), the CPU 310 acquires target pixel data in the order shown in FIG. 6(A). However, if a dithering method is employed in the halftone process of S130 and S160 in FIG. 5, for example, in S105 of the image process A the CPU 310 may acquire target pixel data in the order shown in FIG. 6(B). This method can reduce the time required for setting the target printing direction. In addition, the process of S195 in FIG. 5 may be omitted when a dithering method is employed in the halftone process of S130.

(2) In S105B of the image processes B and C described above (FIGS. 7 and 8) and in S205 of the image process D (FIG. 9), the CPU 310 acquires target pixel data in the order shown in FIG. 6(B). However, in these image processes B, C, and D, the CPU 310 may acquire target pixel data in the order shown in FIG. 6(A).

(3) The process of S158B in the image process B described above (FIG. 7) may be omitted. In this case, in S160B of FIG. 7 the CPU 310 repeats the process for color conversion (that is, executes the color reconversion process) on all the sets of pixel data for which the color conversion process was executed in S125 of FIG. 7 to this point.

(4) In the image process C described above (FIG. 8), the CPU 310 executes the halftone process (S186B) and sets the corresponding nozzles NZ (S188B) after performing the color conversion process on all the sets of pixel data in the target partial image data, i.e., following step S180 or S185. However, the CPU 310 may instead execute the halftone process and set the corresponding nozzle NZ for each pixel after completing each step S120, S125C, and S127C in FIG. 8 for the pixel.

(5) In S330 of FIG. 10 according to the fifth embodiment described above, various methods may be used to determine whether the primary objects in the print image OI are text. For example, the CPU 310 may analyze the image data to be used for printing in order to identify the primary objects in the print image OI and may determine whether the primary objects are text based on the identification results. The CPU 310 may also infer whether the primary objects are text based on printing conditions specified in the print command received from the user. For example, the CPU 310 may determine that the primary objects are drawings or photos when the printing mode specified in the print command is a mode emphasizing image quality, and may determine that the primary objects are text when the specified printing mode is a mode emphasizing speed. As another alternative, the CPU 310 may determine that the primary objects are drawings or photos when the paper used for printing is glossy paper, and may determine that the primary objects are text when the paper used is normal paper. As another alternative, the user may input information at the time of printing indicating whether the primary objects are text or non-text, and the CPU 310 may determine whether the primary objects are text based on this input.

The CPU 310 may also determine whether the primary objects are text for each partial image, for example. In this case, the image process (A, C, or D, for example) to be executed may be changed for each partial image, for example.

(6) The fifth embodiment described above (FIG. 10) gives an example of a determination process (S310-S345) for selecting an image process to execute, but the present disclosure is not limited to this process. For example, the determination in S310 may be omitted when the device executing the image process is not expected to have the multithreading function, for example. Similarly, the determination in S320 may be omitted. If both steps S310 and S320 are omitted, the CPU 310 may begin the process of FIG. 10 by executing the determination in S330 and thereafter may perform the remaining determinations indicated in the flowchart of FIG. 10

Further, while the CPU 310 selects one image process from among the three image processes A, C, and D in the process of FIG. 10, the CPU 310 may select from other image processes to be executed, such as the two image processes A and C. For example, the CPU 310 may select the image process A when the printer 200 has no unprocessed print jobs and the primary objects in the print image OI are text, and may select the image process C in all other cases. In S350 of FIG. 10 the CPU 310 may execute the image process B of FIG. 7 in place of image process A.

(7) In S205 of the image process D in FIG. 9, the CPU 310 acquires only a portion of the plurality of sets of pixel data corresponding to the target determination region to be the target pixel data. However, the CPU 310 may acquire all the sets of pixel data corresponding to the target determination region as the target pixel data.

(8) Further, the CPU 310 may generate scaled-down partial image data by reducing the size of the target partial image data using a prescribed algorithm (nearest-neighbor interpolation or bilinear interpolation, for example) and may acquire target pixel data from the scaled-down partial image data. This method can shorten the processing time required for setting target printing directions by reducing the amount of acquired pixel data. In this case, when the target printing direction is determined for the target partial image data, processes for generating the partial print data (the color conversion process, the halftone process, and the process for setting the nozzles NZ) may be performed for all the sets of pixel data in the original partial image data.

(9) In the image processes A-D described above, the special condition for setting the target printing direction to the preceding printing direction is that the evaluation value EV of at least one determination region BL be greater than or equal to the threshold THv, but the present disclosure is not limited to this condition. For example, the CPU 310 may determine whether the target pixel data (RGB value) represents a color difference producing color having RGB value within a predetermined range, each time target pixel data is acquired, and may increment the count of color difference producing pixels when the target pixel data represents a color difference producing color. Thereafter, the CPU 310 may set the target printing direction to the preceding printing direction if the count of the color difference producing pixels reaches a prescribed threshold before acquisition of the target pixel data in the target partial image. The CPU 310 may set the target printing direction to the direction opposite the preceding printing direction when acquisition of the target pixel data in the target partial image is completed before the count of color difference producing pixels reaches the prescribed threshold.

The CPU 310 may always determine whether to set the target printing direction to the preceding printing direction using all the sets of pixel data included in the target partial image data. For example, the CPU 310 may set the printing direction for the target partial print to the printing direction used for the preceding partial print when an object that includes pixels of specific colors is arranged across both the target partial image and the partial image printed in the preceding partial print. Here, a well-known process for object recognition may be used to identify the position of the object in the image, for example. The outgoing/return color difference can be particularly noticeable in solid regions positioned at the border between the target partial image and the partial image printed in the preceding partial print. Consequently, in the case of such solid regions, the CPU 310 may set the printing direction for the target partial print to the same printing direction used in the preceding partial print. In these cases, the multithreading function may be used to begin a process for setting the target printing direction and a first generation process in parallel. As in the image processes A and B, the CPU 310 then cancels the first generation process and starts the second generation process after setting the target printing direction to the preceding printing direction, or completes the first generation process without starting the second generation process when the target printing direction is set to the direction opposite the preceding printing direction. Alternatively, the CPU 310 may use the multithreading function to begin a process for setting the target printing direction, the first generation process, and the second generation process in parallel. As in the image process C, the CPU 310 then interrupts the first generation process and completes the second generation process when the target printing direction is set to the preceding printing direction, or completes the first generation process while canceling the second generation process when the target printing direction is set to the direction opposite the preceding printing direction.

(10) The nozzle rows in the print head 110 may be arranged in any order from the upstream side in the +X direction in FIG. 2(B), instead of arrangement of the nozzle rows NY, NM, NC, and NK in the +X direction in this order. In order to reduce a color difference caused by the difference in the printing direction, the nozzles rows may be arranged symmetrically about change between the order in the outgoing direction and the order in the return direction. In other words, the arrangement of colors defined by the nozzle rows in the outgoing direction is the same as the arrangement of colors defined by the nozzle rows in the return direction. For example, seven nozzle rows NC, NM, NY, NK, NY, NM, and NC may be arranged in this order in the X direction.

(11) In the image processes of the embodiments described above, a partial image corresponding to a single partial print is processed as a single target partial image. However, a partial image corresponding to a plurality of partial prints may be processed as a single target partial image instead. For example, when a partial image corresponding to three partial prints is processed as a single target partial image, in the first generation process the CPU 310 chooses a suitable profile to execute the color conversion process so that the printing direction for each of the three partial prints is opposite the direction used for the preceding partial print. Thus, in the first generation process the CPU 310 generates three sets of first partial print data so that the three partial prints are respectively printed by an outgoing print, a return print, and an outgoing print or by a return print, an outgoing print, and a return print. Similarly, in the second generation process the CPU 310 executes a color conversion process so that the printing direction for each of the three partial prints is the same direction used for the preceding partial print. Thus, in the second generation process the CPU 310 generates three sets of second partial print data so that the three partial prints are all printed by outgoing prints or by return prints. Hence, the three partial prints are executed bidirectionally using the three sets of first partial print data when the target printing directions are set to the direction opposite the respective preceding printing directions, and are executed unidirectionally using the three sets of second partial print data when the target printing directions are set to the preceding printing directions.

(12) The recording sheet M may be an OHP film, a CD-ROM, or a DVD-ROM, instead of the paper.

(13) In the printing mechanism 100 according to the above-described embodiment, the conveyance unit 140 conveys the sheet M such that the sheet M moves in the conveying direction relative to the print head 110. Alternatively, the sheet M may move in the conveying direction relative to the print head 110 by moving the print head 110 in the direction opposite the conveying direction relative to a sheet M.

(14) In the above-described embodiments, the terminal device 300 is a device performing the image processes A-D. Alternatively, the CPU 210 of the printer 200 may function as an image processing apparatus and perform one or more image processes A-D. In such a case, the CPU 210 functioning as an image processing apparatus outputs print data and direction information to a predetermined memory area in the non-volatile memory 220 or the volatile memory 230 in S190 of FIGS. 5, 7, and 9 and S270 in FIG. 9. The printing mechanism 100 of the printer 200 performs partial print in accordance with the print data and the direction information which are output to the memory area.

In the embodiments, the terminal device 300 is an example of the image processing apparatus, and the printer 200 is an example of the print execution unit. In this variation (14), the CPU 210 of the printer 200 is an example of the image processing apparatus, and the print mechanism 100 is an example of the print execution unit.

The device performing the image processes A-D may be a server that acquires image data from a printer or a terminal device to generate a print job using the acquired print data. Such a server may include a plurality of computers in communication with each other via a network. In such a case, the plurality of computers in communication with each other via a network as a whole is an example of the image processing apparatus.

(15) In the embodiments, at least part of the configuration implemented by hardware may be replaced by software and, conversely at least part of the configuration implemented by software may be replaced by hardware. For example, in a case where the printer 200 executes the image process A shown in FIG. 5, the color conversion process or the color reconversion process and the halftone process may be executed by dedicated hardware such as an ASIC which operates in accordance with instructions from the CPU 210 of the printer 200.

The processes or the steps described in the embodiments and the variations may be arbitrary combined.

While the disclosure has been described in detail with reference to the above embodiments, it would be apparent to those skilled in the art that various changes and modifications may be made thereto.

What is claimed is:

1. An image processing apparatus comprising:
   a processor for controlling a print execution unit including:
   a print head;
   a main scanning unit configured to perform a first move to move the print head in a first direction and a second move to move the print head in a second direction, the second direction being opposite to the first direction; and
   a memory storing a first color conversion profile and a second color conversion profile;
   wherein the processor is configured to perform:
   printing a first image while the main scanning unit performs the first move, the first image being based on first image data;
   determining whether a color difference is larger than or equal to a reference, the color difference indicating a difference between color printed using first converted data and color printed using second converted data, the first converted data being converted from second image data using the first color conversion profile, the second converted data being converted from the second image data using the second color conversion profile;

printing a second image based on the first converted data while the main scanning unit performs the second move when the color difference is smaller than the reference; and printing a third image based on the second converted data while the main scanning unit performs the first move when the color difference is larger than or equal to the reference.

2. The image processing apparatus according to the claim 1, wherein the head includes a first nozzle configured to eject first type ink and a second nozzle configured to eject second type ink, wherein the first type ink has first color and the second type ink has second color, wherein the print execution unit prints an image of the first color using the first type ink, wherein the print execution unit prints an image of the second color using the second type ink, and wherein the processor determines the color difference is smaller than the reference when the second image has no specific color pixel, the specific color pixel having specific color represented by both the first color and the second color.

3. The image processing apparatus according to the claim 1, wherein the print execution unit includes a sub scanning unit configured to perform a sub scan to move a recording sheet in a sub scanning direction crossing the first direction, wherein the second image is adjacent to the first image in the sub scanning direction, and wherein the third image is adjacent to the first image in the sub scanning direction.

4. The image processing apparatus according to the claim 1, wherein the print execution unit includes a sub scanning unit configured to perform a sub scan to move a recording sheet in a sub scanning direction crossing the first direction, wherein the second image partially overlaps with the first image in the sub scanning direction, and wherein the third image partially overlaps with the first image in the sub scanning direction.

5. The image processing apparatus according to the claim 1, wherein the processor converts the second image data to the first converted data before the determining, the first converted data having CMYK components.

6. The image processing apparatus according to the claim 5, wherein the processor converts the second image data to the second converted data after the determining when the color difference is larger than or equal to the reference, the first converted data having CMYK components.

7. The image processing apparatus according to the claim 5, wherein the processor further converts the second image data to the second converted data before the determining, the second converted data having CMYK components.

8. The image processing apparatus according to the claim 5, wherein the processor executes a halftone process on the first converted data, the halftone process producing data specifying dot formation state for each of CMYK components of the second image.

9. The image processing apparatus according to the claim 8, wherein the processor acquires a single set of pixel data from among plurality of sets of pixel data in a line of the second image data, the line formed of a plurality of pixels for one row extending in the first direction, the acquired single set of pixel data being used in the determining.

10. The image processing apparatus according to the claim 8, wherein the halftone process is executed before the determining.

11. The image processing apparatus according to the claim 8, wherein the halftone process is executed after the determining.

12. An image processing apparatus comprising:

a processor for controlling a print execution unit including:
  a print head;
  a main scanning unit configured to perform a first move to move the print head moves in a first direction and a second move to move the print head moves in a second direction, the second direction being opposite to the first direction; and a memory storing a first color conversion profile and a second color conversion profile;

wherein the processor is configured to perform:
  printing a first image while the main scanning unit performs the first move, the first image being based on first converted image data that is converted from first image data;
  setting a plurality of determination regions in second image data, wherein the plurality of determination regions includes a first determination region and a second determination region, the first determination region satisfying a specific condition, the second determination region not satisfying a specific condition;
  converting the second image data to a second converted image data before determining whether the specific condition is satisfied for each part of the second image data;
  determining whether the specific condition is satisfied for each part of the second image data, wherein each part of the second image data includes all respective pixels in a corresponding one of the plurality of determination regions;
  converting a part of the second image data corresponding to the second determination region to another converted data after determining that the specific condition is not satisfied for the part of the second image data corresponding to the second determination region; and
  printing a second image while the main scanning unit performs the first move when the specific condition is satisfied, the second image being based on second converted image data that is converted from second image data, wherein the first image data is converted to the first converted image data by using the first color conversion profile, and wherein the second image data is converted to the second converted image data by using the second color conversion profile.

\* \* \* \* \*

UNITED STATES PATENT AND TRADEMARK OFFICE
CERTIFICATE OF CORRECTION

PATENT NO. : 11,010,648 B2
APPLICATION NO. : 16/887718
DATED : May 18, 2021
INVENTOR(S) : Shota Morikawa et al.

It is certified that error appears in the above-identified patent and that said Letters Patent is hereby corrected as shown below:

In the Claims

Column 34, Claim 9, Line 4:
Please delete "among plurality of sets" and insert --among a plurality of sets--

Column 34, Claim 12, Line 27:
Please delete "move the print head moves in" and insert --move the print head in--

Column 34, Claim 12, Line 28:
Please delete "move the print head moves in" and insert --move the print head in--

Column 34, Claim 12, Lines 45 and 46:
Please delete "to a second converted image data" and insert --to second converted image data--

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*